United States Patent
Nagata et al.

(10) Patent No.: US 10,547,792 B2
(45) Date of Patent: Jan. 28, 2020

(54) CONTROL DEVICE, CONTROL METHOD, AND PROGRAM FOR CONTROLLING LIGHT INTENSITIES

(71) Applicant: SONY CORPORATION, Tokyo (JP)

(72) Inventors: Masaharu Nagata, Tokyo (JP); Takeshi Ohashi, Kanagawa (JP); Satoshi Suzuki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 77 days.

(21) Appl. No.: 15/324,488

(22) PCT Filed: Jun. 12, 2015

(86) PCT No.: PCT/JP2015/067093
§ 371 (c)(1),
(2) Date: Jan. 6, 2017

(87) PCT Pub. No.: WO2016/031350
PCT Pub. Date: Mar. 3, 2016

(65) Prior Publication Data
US 2017/0208237 A1    Jul. 20, 2017

(30) Foreign Application Priority Data

Aug. 29, 2014   (JP) .................................. 2014-174677

(51) Int. Cl.
*H04N 5/235*        (2006.01)
*G06T 7/70*         (2017.01)

(52) U.S. Cl.
CPC ............. *H04N 5/2354* (2013.01); *G06T 7/70* (2017.01); *G06T 2207/30244* (2013.01)

(58) Field of Classification Search
CPC .................................. H04N 5/2354; G06T 7/70
See application file for complete search history.

(56) References Cited

U.S. PATENT DOCUMENTS

| 8,363,157 B1* | 1/2013 | Han | H04N 5/2256 348/370 |
| 2013/0120636 A1* | 5/2013 | Baer | H04N 5/2354 348/335 |
| 2017/0208230 A1* | 7/2017 | Laroia | H04N 5/2258 |

* cited by examiner

*Primary Examiner* — Nicholas G Giles
(74) *Attorney, Agent, or Firm* — Paratus Law Group, PLLC

(57) ABSTRACT

There is provided a control device, a control method, and a program through which it is possible to reduce nonuniformity of brightness in an imaging region and implement a more suitable imaging environment, the control device including: an acquisition unit configured to acquire an image that is captured by an imaging unit; and a control unit configured to control light intensities of auxiliary light beams emitted from auxiliary light emitting units that are associated in advance with a plurality of partial regions in an imaging region determined based on an angle of view of the imaging unit among the plurality of auxiliary light emitting units based on an analysis result of the acquired image.

19 Claims, 19 Drawing Sheets

FIG. 14
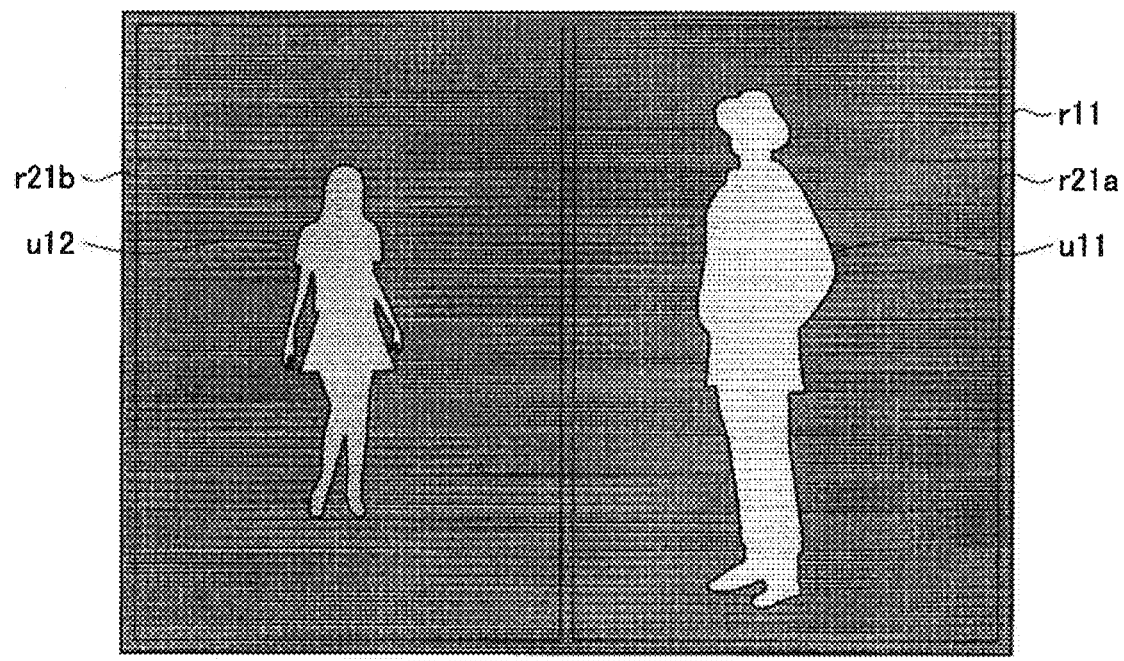

FIG. 15
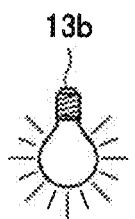
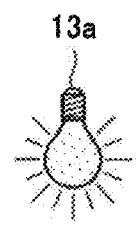
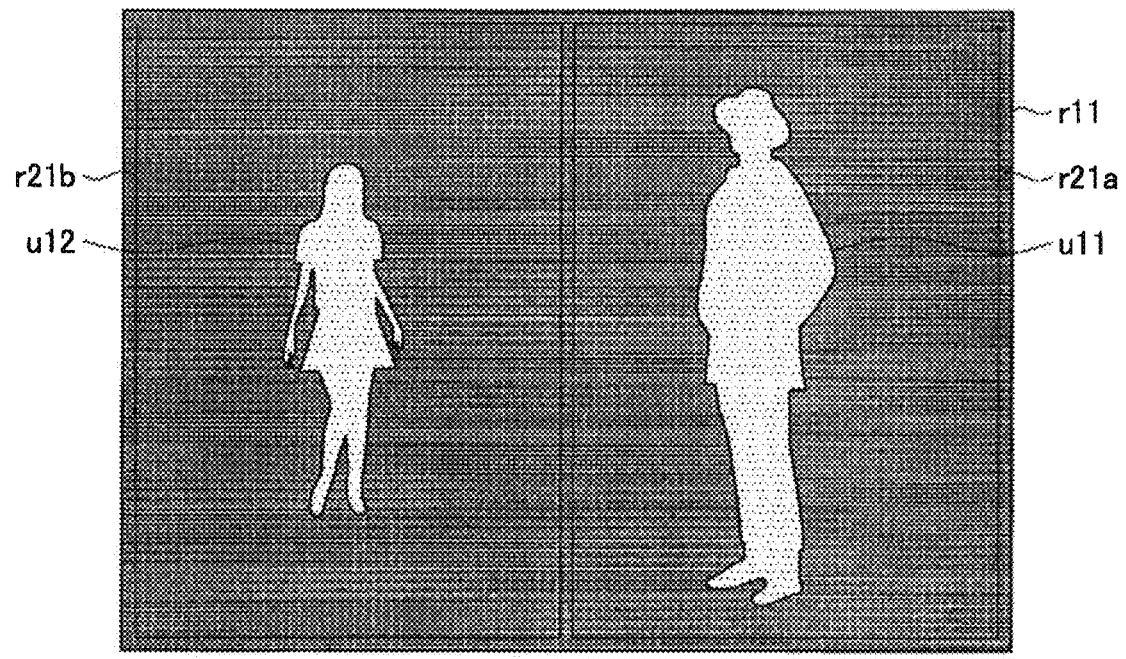

CONTROL DEVICE, CONTROL METHOD, AND PROGRAM FOR CONTROLLING LIGHT INTENSITIES

CROSS REFERENCE TO PRIOR APPLICATION

This application is a National Stage Patent Application of PCT International Patent Application No. PCT/JP2015/067093 (filed on Jun. 12, 2015) under 35 U.S.C. § 371, which claims priority to Japanese Patent Application No. 2014-174677 (filed on Aug. 29, 2014), which are all hereby incorporated by reference in their entirety.

TECHNICAL FIELD

The present disclosure relates to a control device, a control method, and a program.

BACKGROUND ART

In recent years, imaging devices such as a digital still camera and a digital video camera have become widespread. In such imaging devices, when exposure conditions, for example, an aperture and a shutter speed, are controlled, brightness of a subject that is captured in an image is controlled in some cases. In addition, some of the imaging devices can supplement illuminance by emitting so-called auxiliary light toward a subject.

In addition, as another method, there is provided a method in which correction processing is performed on a captured image and thus brightness of a subject that is captured in the image is controlled. For example, Patent Literature 1 discloses an exemplary method in which correction processing is performed on a captured image and thus brightness (in other words, brightness of a subject that is captured in the image) of the image is controlled.

CITATION LIST

Patent Literature

Patent Literature 1 JP 2009-71400A

DISCLOSURE OF INVENTION

Technical Problem

Meanwhile, not all regions (hereinafter referred to as "imaging regions") captured in an image by an imaging device are necessarily illuminated at the same brightness. Also under such a situation, if brightnesses of all imaging regions are uniformly controlled, for example, by controlling exposure conditions, a plurality of subjects in the imaging region are not necessarily captured at appropriate brightnesses (exposures).

Therefore, the present disclosure proposes a control device, a control method, and a program through which it is possible to reduce nonuniformity of brightness in an imaging region and implement a more suitable imaging environment.

Solution to Problem

According to the present disclosure, there is provided a control device including: an acquisition unit configured to acquire an image that is captured by an imaging unit; and a control unit configured to control light intensities of auxiliary light beams emitted from auxiliary light emitting units that are associated in advance with a plurality of partial regions in an imaging region determined based on an angle of view of the imaging unit among the plurality of auxiliary light emitting units based on an analysis result of the acquired image.

According to the present disclosure, there is provided a control method including: acquiring an image captured by an imaging unit; and controlling, by processor, light intensities of auxiliary light beams emitted from auxiliary light emitting units that are associated in advance with a plurality of partial regions in an imaging region determined based on an angle of view of the imaging unit among the plurality of auxiliary light emitting units based on an analysis result of the acquired image.

According to the present disclosure, there is provided a program causing a computer to execute: acquiring an image captured by an imaging unit; and controlling light intensities of auxiliary light beams emitted from auxiliary light emitting units that are associated in advance with a plurality of partial regions in an imaging region determined based on an angle of view of the imaging unit among the plurality of auxiliary light emitting units based on an analysis result of the acquired image.

Advantageous Effects of Invention

According to the present disclosure described above, there are provided a control device, a control method, and a program through which it is possible to reduce nonuniformity of brightness of an imaging region and implement a more suitable imaging environment.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 14 is an explanatory diagram for describing an overview of the imaging device according to the embodiment.

FIG. 15 is an explanatory diagram for describing an overview of the imaging device according to the embodiment.

MODE(S) FOR CARRYING OUT THE INVENTION

Figure 1:
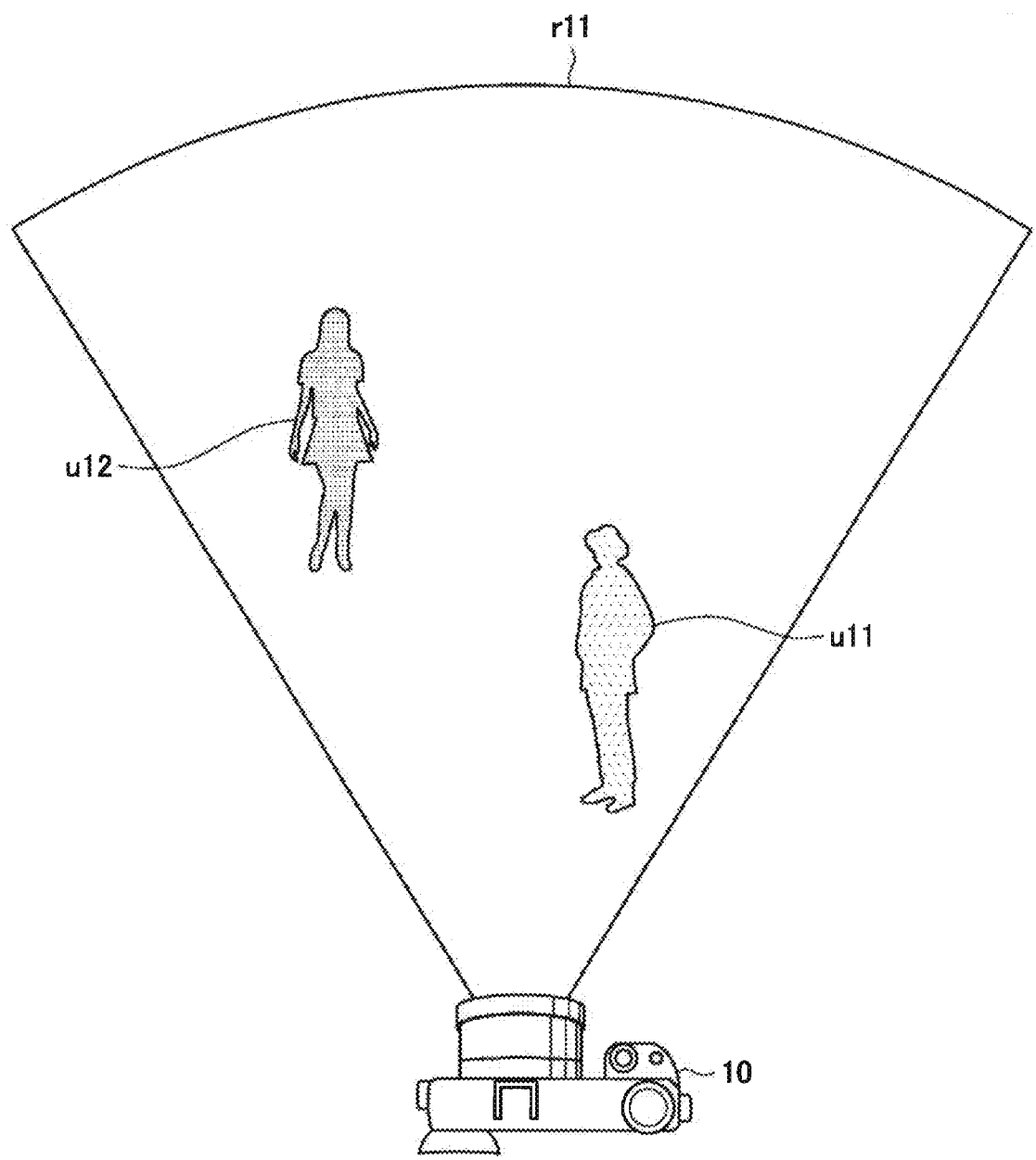
FIG. 1 is an explanatory diagram for describing an overview of an imaging device according to a first embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Description will proceed in the following order.
1. First Embodiment
   1.1. Overview
   1.2. Functional configuration
   1.3. Processes
   1.4. Modified Examples
   1.4.1. Modified Example 1: Application example of imaging device
   1.4.2. Modified Example 2: Control example of auxiliary light
   1.4.3. Modified Example 3: Control example of auxiliary light
   1.5. Summary
2. Second Embodiment
   2.1. Overview
   2.2. Functional configuration
   2.3. Processes
   2.4. Modified example
   2.5. Summary
3. Hardware configuration
4. Summary

1. First Embodiment

1.1. Overview

In order for characteristics of an imaging device according to a first embodiment of the present disclosure to be more easily understood, first, as an overview, challenges of the imaging device according to the embodiment will be summarized with reference to FIG. 1. FIG. 1 is an explanatory diagram for describing an overview of the imaging device according to the embodiment.

In FIG. 1, a reference sign r11 schematically indicates a region (that is, an imaging region) that is captured as an image by an imaging device 10. The imaging region r11 is determined based on, for example, an angle of view of the imaging device 10. In addition, reference signs u11 and u12 schematically indicate subjects in the imaging region r11 of the imaging device 10.

Note that, in this description, in order for characteristics of the imaging device 10 according to the embodiment to be more easily understood, as shown in FIG. 1, a case in which the subject u11 is at a position closer to the imaging device 10 than the subject u12 is will be described.

In addition, the example shown in FIG. 1 shows a state in which the subjects u11 and u12 are illuminated at different brightnesses when the subjects u11 and u12 are referenced from a position of the imaging device 10. In this case, when the subjects u11 and u12 are referenced from the position of the imaging device 10, the subjects u11 and u12 are illuminated such that the subject u11 is brighter than the subject u12.

As shown in FIG. 1, under a situation in which the subjects u11 and u12 having different brightnesses are present, it is difficult to control the subjects u11 and u12 in the image captured by the imaging device 10 such that they have appropriate brightnesses (exposures) in some cases.

As a specific example, description will focus particularly on a case in which, by changing exposure conditions such as an aperture and a shutter speed, brightnesses (exposures) of the subjects u11 and u12 in the image captured by the imaging device 10 are controlled.

For example, in FIG. 1, when the subject u11 illuminated to be brighter is imaged at an appropriate exposure, the imaging device 10 controls exposure conditions such that an aperture becomes narrower and a shutter speed becomes faster in order to limit a light intensity of light received by an imaging element. On the other hand, when the subject u12 illuminated to be darker is imaged at an appropriate exposure, the imaging device 10 controls exposure conditions such that an aperture opens further and a shutter speed becomes slower in order to control a light intensity of light received by an imaging element such that it becomes greater.

That is, exposure conditions for imaging the subjects u11 and u12 having different brightnesses at appropriate exposures are different from each other. Therefore, for example, when exposure conditions are set such that the subject u11 is imaged at an appropriate exposure, the subject u12 darker than the subject u11 is captured in an image in a so-called underexposed state (that is, imaged more darkly). On the other hand, when exposure conditions are set such that the subject u12 is imaged at an appropriate exposure, the subject u11 brighter than the subject u12 is captured in an image in a so-called overexposed state (that is, imaged more brightly).

In this manner, when exposures (brightnesses) of the subjects u11 and u12 in an image are controlled by controlling exposure conditions, since the exposure conditions are uniformly controlled, it is difficult to control the subjects u11 and u12 such that they have appropriate exposures in some cases.

In addition, as another method, there is a method in which auxiliary light is emitted toward the subjects u11 and u12 in the imaging region r11, and thus brightness (illuminance) of the subjects u11 and u12 is supplemented. In this case, a subject that is closer to an auxiliary light emitting unit (that is, a light source) configured to emit auxiliary light is illuminated more brightly according to the auxiliary light.

For example, in FIG. 1, when an auxiliary light emitting unit is provided in the imaging device 10, the subject u11 is illuminated more brightly than the subject u12 according to auxiliary light emitted from the auxiliary light emitting unit. Therefore, for example, when a light intensity of auxiliary light is controlled such that the subject u11 is imaged at an appropriate exposure, the subject u12 is captured in an image in a so-called underexposed state without obtaining a light intensity sufficient for illuminating the subject u12. On the other hand, when a light intensity of auxiliary light is controlled such that the subject u12 is imaged at an appropriate exposure, auxiliary light of an excessive light intensity is emitted toward the subject u11, and the subject u11 is captured in an image in a so-called overexposed state.

In this manner, even when auxiliary light is emitted to control exposures (brightnesses) of the subjects u11 and u12, it is difficult to control the subjects u11 and u12 such that they have appropriate exposures.

In view of the above-described situation, an object of the imaging device 10 according to the embodiment is to reduce nonuniformity of the brightness and implement a more suitable imaging environment even under a situation in which brightness of an imaging region is nonuniform.

Specifically, the imaging device 10 according to the embodiment divides the imaging region r11 into a plurality of partial regions, emits auxiliary light toward each of the partial regions using an auxiliary light emitting unit that is different for each of the partial regions, and thus controls brightness for each of the partial regions.

Figure 2:
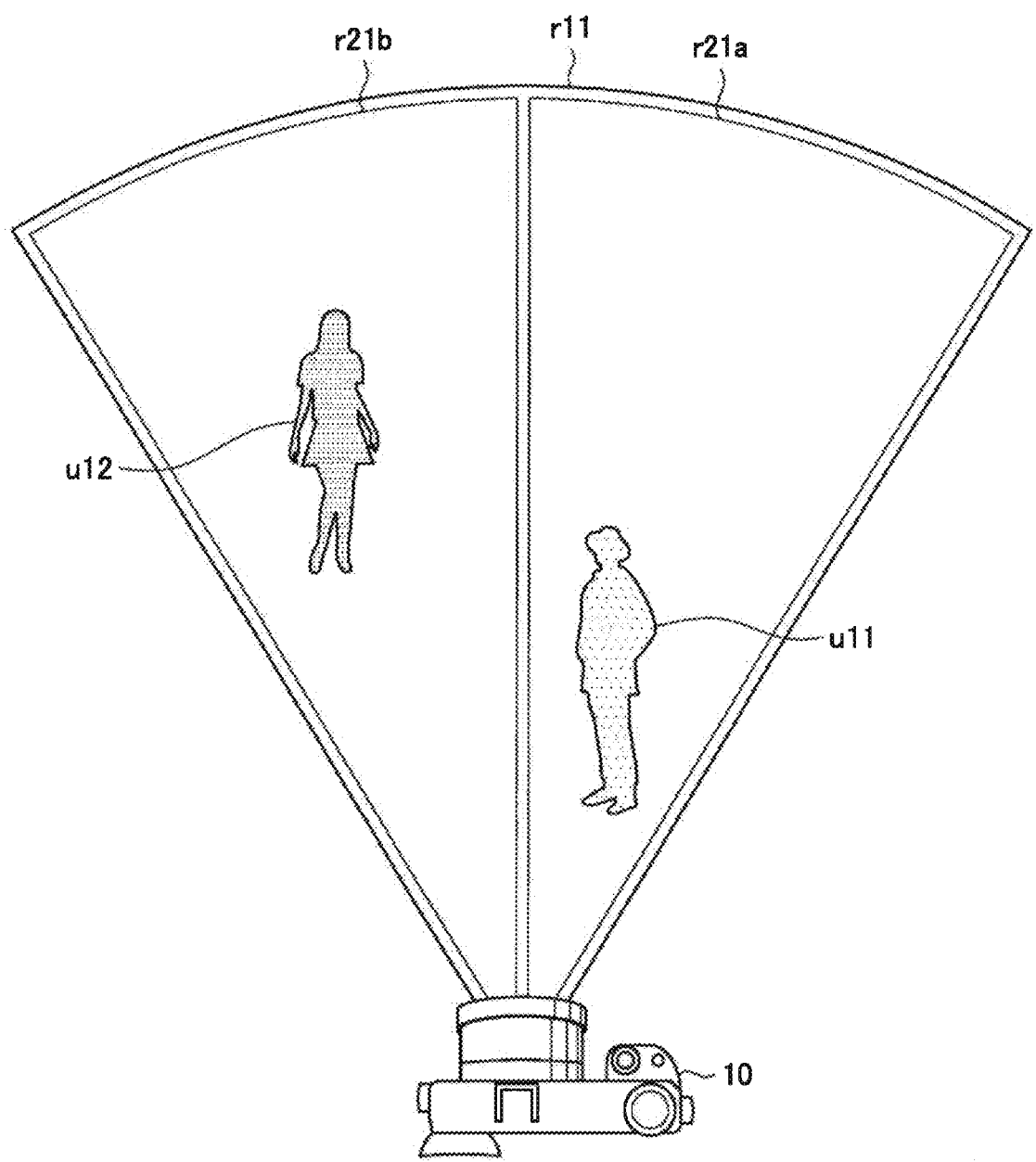
FIG. 2 is an explanatory diagram for describing an overview of the imaging device according to the embodiment.

For example, FIG. 2 is an explanatory diagram for describing an overview of the imaging device 10 according to the embodiment. In the example shown in FIG. 2, the imaging device 10 divides the imaging region r11 into a plurality of partial regions r21a and r21b, and emits auxiliary light toward the partial regions r21a and r21b using different auxiliary light emitting units.

In this case, the imaging device 10 according to the embodiment analyzes a captured image (for example, a through image) of the imaging region r11, and individually controls light intensities of auxiliary light beams that are emitted toward the partial regions r21a and r21b based on the analysis result of the image. Specifically, the imaging device 10 controls a light intensity of auxiliary light that is emitted toward the partial region r21 according to a luminance distribution of a region corresponding to the partial region r21 in the captured image (hereinafter simply referred to as a "partial region r21 in an image" in some cases).

Figure 3:
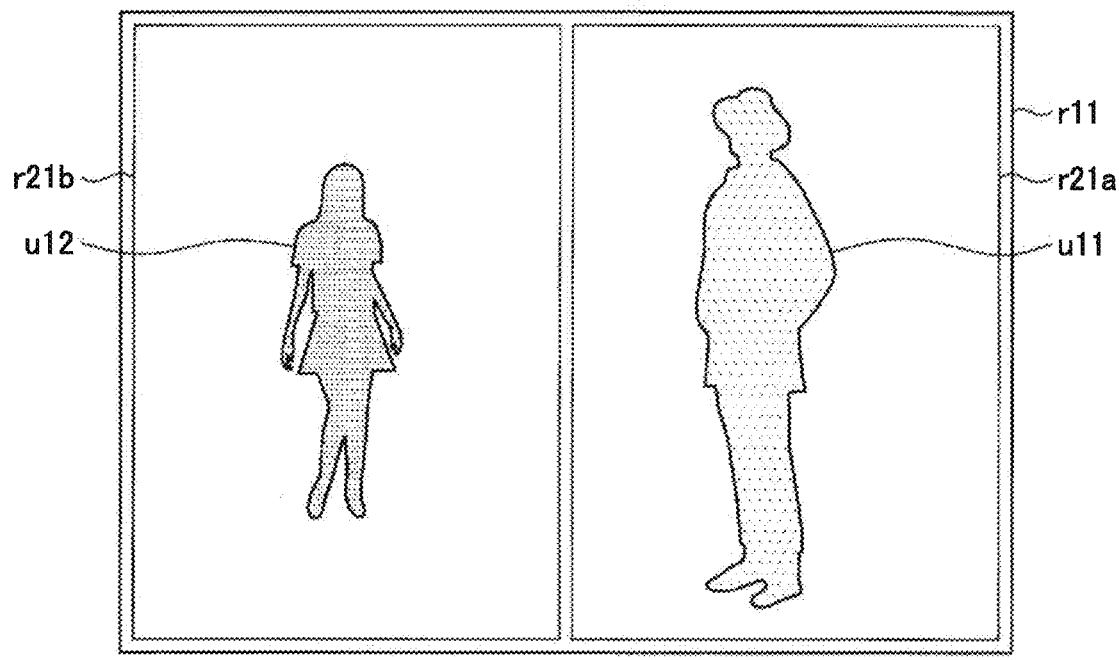
FIG. 3 is an explanatory diagram for describing an overview of the imaging device according to the embodiment.

For example, FIG. 3 is an explanatory diagram for describing an overview of the imaging device 10 according to the embodiment and shows an example in which the imaging device 10 emits auxiliary light of the same light intensity toward the partial regions r21a and r21b in the example shown in FIG. 2. Specifically, FIG. 3 schematically shows a relation among amounts of light emission of auxiliary light emitting units corresponding to the partial regions r21a and r21b, exposures of the partial regions r21a and r21b, and a luminance distribution of the partial regions r21a and r21b.

The upper illustration of FIG. 3 schematically shows light emission states of auxiliary light emitting units configured to emit auxiliary light toward the partial regions r21a and r21b. Note that, in this description, as shown in the upper illustration of FIG. 3, an auxiliary light emitting unit (a light source) configured to emit auxiliary light toward the partial region r21a is referred to as an "auxiliary light emitting unit 13a" and an auxiliary light emitting unit (a light source) configured to emit auxiliary light toward the partial region r21b is referred to as an "auxiliary light emitting unit 13b." Also, in the following description, when the auxiliary light emitting units 13a and 13b are not particularly distinguished, they will be simply referred to as an "auxiliary light emitting unit 13" in some cases.

In addition, the middle illustration of FIG. 3 schematically shows an image captured by the imaging device 10 and specifically, schematically shows an example of exposures (that is, brightnesses) of the subjects u11 and u12 in the image according to emission of auxiliary light from the auxiliary light emitting units 13a and 13b. In addition, the lower illustration of FIG. 3 schematically shows an example of a luminance distribution of the image of the middle illustration of FIG. 3. Here, a vertical axis of the luminance distribution shown in the lower illustration of FIG. 3 schematically represents luminance as a relative value. In addition, a position (coordinates) in a lateral direction of the image shown in the middle illustration of FIG. 3 corresponds to a position along a horizontal axis shown in the lower illustration of FIG. 3.

Figure 4:
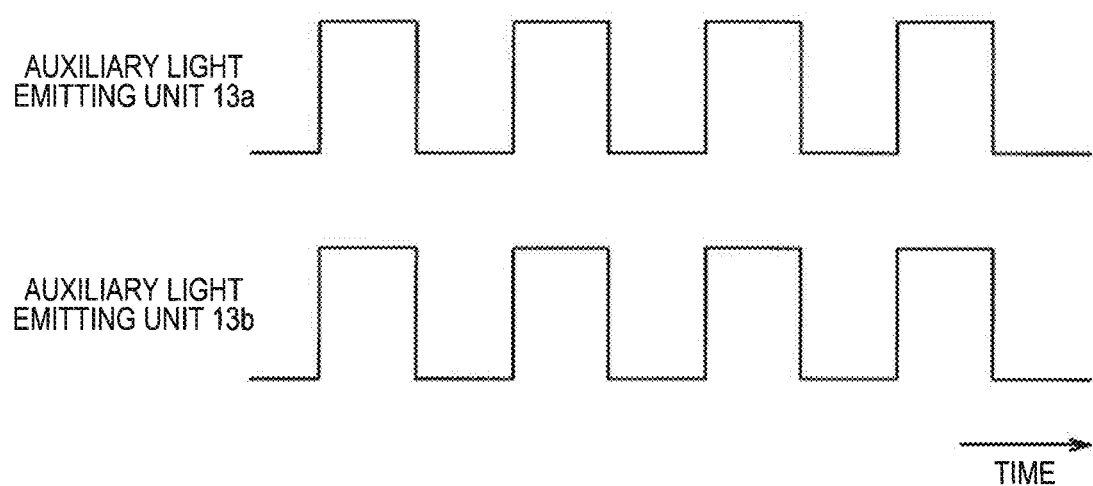
FIG. 4 is a schematic timing chart showing examples of light emission timings of auxiliary light emitting units in an example shown in FIG. 3.

In addition, FIG. 4 is a schematic timing chart showing an example of light emission timings of the auxiliary light emitting units 13a and 13b in the example shown in FIG. 3. Note that a horizontal axis in FIG. 4 represents a time. The example shown in FIG. 4 shows an example in which the auxiliary light emitting units 13a and 13b emit auxiliary light of the same light intensity at timings that are synchronized.

As shown in FIG. 3 and FIG. 4, when auxiliary light of the same light intensity is emitted toward the partial regions r21a and r21b, a subject closer to a light source (that is, the auxiliary light emitting unit 13) of auxiliary light is illuminated more brightly according to the auxiliary light. For example, in the example shown in FIG. 3, the subject u11 is at a position closer to the imaging device 10 (that is, the auxiliary light emitting unit 13 that is a light source of auxiliary light) than the subject u12 is as shown in FIG. 2. Therefore, when luminance of the subject u11 in the image captured by the imaging device 10 is set as $I_{11}$ and luminance of the subject u12 is set as $I_{12}$, "(luminance $I_{11}$ of subject u11)>(luminance $I_{12}$ of subject u12)" is established as shown in the luminance distribution of the lower illustration of FIG. 3.

The imaging device 10 according to the embodiment analyzes a captured image (for example, a through image) of the imaging region r11 and thus generates a luminance distribution (in other words, a luminance distribution of the partial regions r21a and r21b) of the imaging region r11 as shown in the lower illustration of FIG. 3. Then, the imaging device 10 controls a light intensity of auxiliary light that is emitted from the auxiliary light emitting unit 13 corresponding to each of the partial regions r21 according to the generated luminance distribution.

Figure 5:
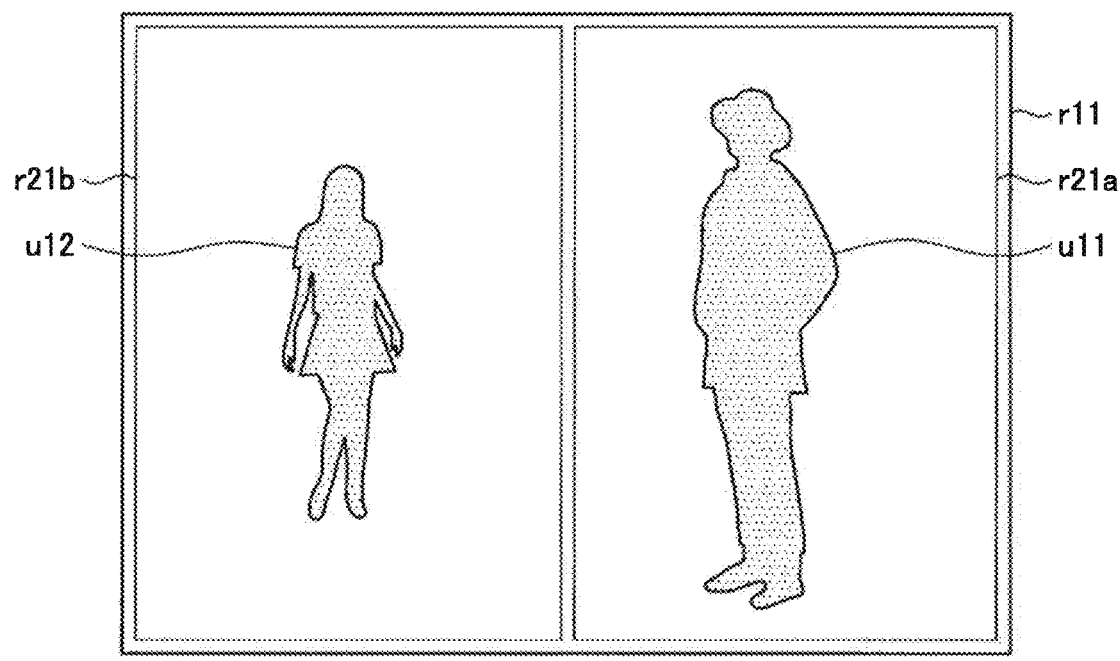
FIG. 5 is an explanatory diagram for describing an overview of the imaging device according to the embodiment.

For example, FIG. 5 is an explanatory diagram for describing an overview of the imaging device 10 according to the embodiment and shows an example of details of light intensities of auxiliary light beams emitted from the auxiliary light emitting units 13 that are controlled by the imaging device 10. For example, in the example shown in FIG. 5, the imaging device 10 controls a light intensity of auxiliary light that is emitted from the auxiliary light emitting unit 13 corresponding to each of the partial regions r21 such that luminances of the subjects u11 and u12 captured in the image are substantially the same.

Specifically, the subject u11 is in the partial region r21a, and pixels having relatively high luminance are distributed in a corresponding region in the captured image. Therefore, for example, the imaging device 10 suppresses a light intensity of auxiliary light that is emitted toward the partial region r21a and thus controls an operation of the auxiliary light emitting unit 13a corresponding to the partial region r21a emitting auxiliary light such that the subject u11 is imaged more darkly than that of the example shown in FIG. 3.

On the other hand, the subject u12 is in the partial region r21b, and pixels having relatively low luminance are distributed in a corresponding region in the captured image. Therefore, for example, the imaging device 10 increases a light intensity of auxiliary light that is emitted toward the partial region r21b and thus controls an operation of the auxiliary light emitting unit 13b corresponding to the partial region r21b emitting auxiliary light such that the subject u12 is imaged more brightly than that of the example shown in FIG. 3.

Figure 6:
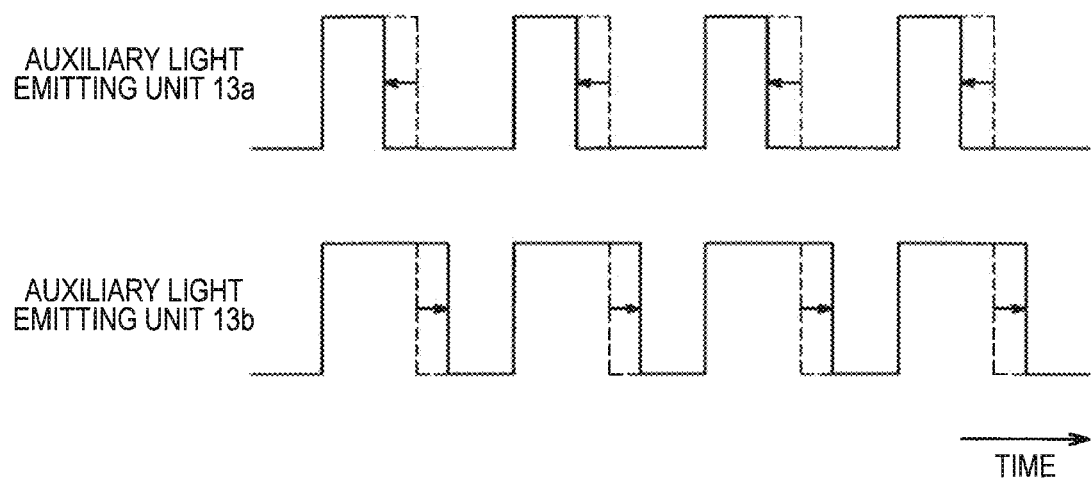
FIG. 6 is a schematic timing chart showing examples of light emission timings of auxiliary light emitting units in an example shown in FIG. 5.

For example, FIG. 6 is a schematic timing chart showing an example of light emission timings of the auxiliary light emitting units 13a and 13b in the example shown in FIG. 5. Here, similarly to the example shown in FIG. 4, a horizontal axis of FIG. 6 represents a time. In the example shown in FIG. 6, the imaging device 10 controls light emission times of the auxiliary light emitting units 13a and 13b and thus controls light intensities of auxiliary light beams that are emitted from the auxiliary light emitting units 13.

As a specific example, the imaging device 10 performs control such that a light emission time of the auxiliary light emitting unit 13a is shorter than that of the example shown in FIG. 4, and thus suppresses a light intensity of auxiliary light that is emitted from the auxiliary light emitting unit 13a toward the partial region r21a. In addition, the imaging device 10 performs control such that a light emission time of the auxiliary light emitting unit 13b is longer than that of the example shown in FIG. 4, and thus increases a light intensity of auxiliary light that is emitted from the auxiliary light emitting unit 13b toward the partial region r21b.

However, the example shown in FIG. 6 is only an example. As long as the imaging device 10 can control a light intensity of auxiliary light that is emitted from each of the auxiliary light emitting units 13, a method thereof is not particularly limited. As a specific example, the imaging device 10 may control an amount of light emission (for example, a current value causing a light source to emit light) of the auxiliary light emitting unit 13 and thus may control a light intensity of auxiliary light that is emitted from the auxiliary light emitting unit 13. It should be noted that the imaging device 10 controls both an amount of light emission of the auxiliary light emitting unit 13 and a light emission time of the auxiliary light emitting unit 13, and thus may control a light intensity of auxiliary light that is emitted from the auxiliary light emitting unit 13.

Based on such control, as shown in FIG. 5, the imaging device 10 performs control such that luminances of subjects (that is, the subjects u11 and u12) in the partial regions r21 captured in the image have a luminance value $I_{13}$ that is determined in advance. Accordingly, luminances of subjects in the partial regions r21 captured in the image are controlled such that they are substantially the same. Also, the luminance value $I_{13}$ may be determined in advance according to a usage form of the imaging device 10 and stored in a region which is readable by the imaging device 10. In addition, as another example, the luminance value $I_{13}$ may be determined based on previous settings according to a user manipulation.

Also, in the example shown in the above, a case in which the imaging region r11 is divided into two partial regions r21a and r21b has been exemplified. However, as long as the imaging region r11 is divided into a plurality of partial regions r21 and auxiliary light is emitted toward the partial regions r21 from different auxiliary light emitting units 13, the numbers of partial regions r21 and auxiliary light emitting units 13 are not particularly limited. In addition, the number of auxiliary light emitting units 13 that are associated with one partial region r21 is not particularly limited, and a plurality of auxiliary light emitting units 13 may be associated with at least some of the partial regions r21.

As described above, the imaging device 10 according to the embodiment divides the imaging region r11 into the plurality of partial regions r21 and associates the different auxiliary light emitting units 13 with the partial regions r21 in advance. Then, the imaging device 10 emits auxiliary light from the auxiliary light emitting units 13 associated with the partial regions r21 toward the partial regions r21 and thus controls brightness for each of the partial regions r21.

In addition, in this case, the imaging device 10 controls a light intensity of auxiliary light that is emitted from the auxiliary light emitting units 13 associated with the partial regions r21 according to a luminance distribution of the partial regions r21 in the captured image of the imaging region r11. In such a configuration, the imaging device 10 according to the embodiment can reduce nonuniformity of brightness and implement a more suitable imaging environment even under a situation in which the brightness of the imaging region is nonuniform.

The overview of the imaging device 10 according to the embodiment has been described above with reference to FIG. 1 to FIG. 6. In addition, the imaging device 10 according to the embodiment will be described below in further detail.

1.2. Functional Configuration

Figure 7:
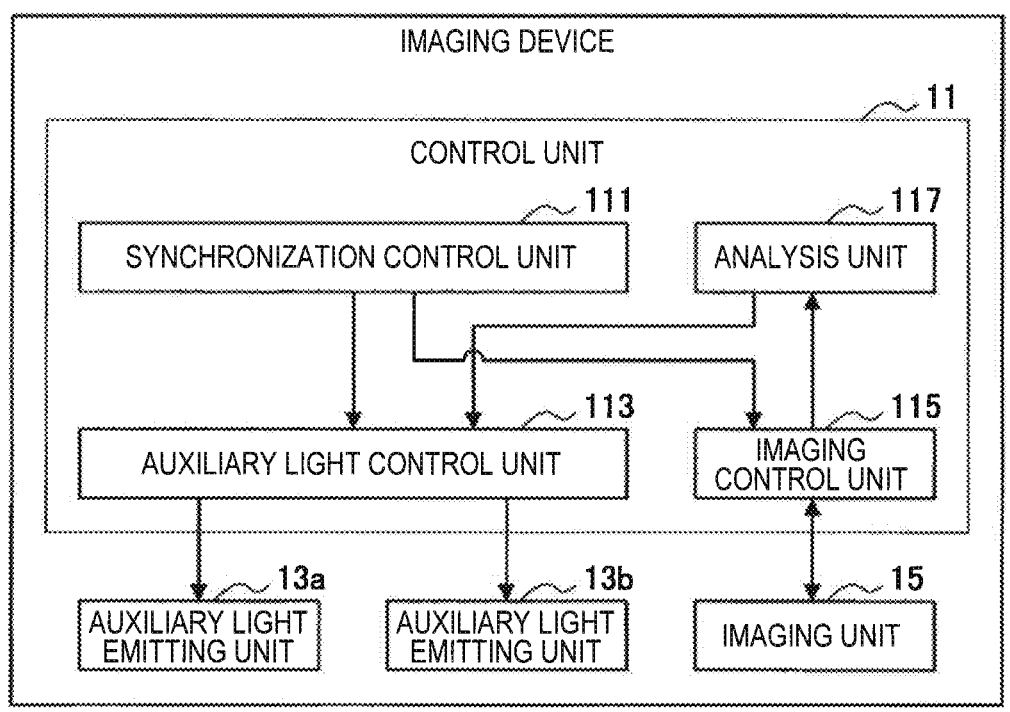
FIG. 7 is a block diagram showing an example of a functional configuration of the imaging device according to the embodiment.

First, an example of a functional configuration of the imaging device 10 according to the embodiment will be described with reference to FIG. 7. FIG. 7 is a block diagram showing an example of a functional configuration of the imaging device 10 according to the embodiment.

As shown in FIG. 7, the imaging device 10 according to the embodiment includes a control unit 11, the plurality of auxiliary light emitting units 13, and an imaging unit 15. In addition, the control unit 11 includes a synchronization control unit 111, an auxiliary light control unit 113, an imaging control unit 115, and an analysis unit 117.

Note that, in this description, similarly to the examples shown in FIG. 2 to FIG. 6 described above, the imaging device 10 including the auxiliary light emitting units 13a and 13b as the plurality of auxiliary light emitting units 13 will be described. In addition, the auxiliary light emitting unit 13a provided to emit auxiliary light toward the partial region r21a in the imaging region r11 (that is, an installation position, an orientation, an illuminating angle of auxiliary light, and the like are set) is described. Similarly, the auxiliary light emitting unit 13b is provided to emit auxiliary light toward the partial region r21b in the imaging region r11.

The imaging unit 15 is a component for capturing an image (for example, a still image or a moving image) of a subject and includes an imaging element such as a complementary metal-oxide semiconductor (CMOS) image sensor and a charge coupled device (CCD) image sensor and an optical system such as a lens.

The auxiliary light emitting unit 13 is a component for emitting auxiliary light toward a subject and includes a light source configured to emit the auxiliary light. Also, a kind of auxiliary light emitted toward a subject from the auxiliary light emitting unit 13 is not particularly limited. As a specific example, the auxiliary light emitting unit 13 may be configured to emit so-called visible light as auxiliary light. In addition, as another example, the auxiliary light emitting unit 13 may be configured to emit invisible light such as infrared (IR) light as auxiliary light.

The synchronization control unit 111 generates a synchronization signal for connecting (for example, synchronizing) a timing at which the imaging unit 15 captures an image and a timing at which each of the plurality of auxiliary light emitting units 13 emits auxiliary light. Note that, in this case, the synchronization control unit 111 may generate a synchronization signal according to at least one of a shutter speed of the imaging unit 15 and an interval during which each of the auxiliary light emitting units 13 emits auxiliary light (hereinafter referred to as a "light emission interval of the auxiliary light emitting unit 13" in some cases).

Then, the synchronization control unit 111 supplies the generated synchronization signal to the imaging control unit 115 and the auxiliary light control unit 113 which will be described below.

The imaging control unit 115 is a component for controlling an operation of the imaging unit 15 capturing an image (controlling, for example, an imaging timing, an imaging time, and exposure conditions).

The imaging control unit 115 controls an imaging timing of the imaging unit 15 in synchronization with a control signal supplied from the synchronization control unit 111. In this case, the imaging control unit 115 may control an imaging time of the imaging unit 15 based on the supplied control signal. In such a configuration, the imaging control unit 115 can cause the imaging unit 15 to capture an image in synchronization with, for example, a timing at which the auxiliary light emitting unit 13 emits auxiliary light.

In addition, the imaging control unit 115 causes the imaging unit 15 to capture an image of the imaging region r11 at a timing that is determined in advance and outputs the captured image to the analysis unit 117 to be described below. Note that, in this case, as long as the image captured by the imaging unit 15 has an amount of data with which the analysis unit 117 to be described below can perform analysis processing (for example, a process of generating the above-described luminance distribution) on the image, a size and a resolution of the image are not particularly limited. As a specific example, the imaging control unit 115 causes the imaging unit 15 to capture a so-called through image (that is, a thinned image), and may output the through image to the analysis unit 117. Here, the imaging control unit 115 corresponds to an example of an "acquisition unit."

The analysis unit 117 acquires an image of the imaging region r11 captured by the imaging unit 15 from the imaging control unit 115. The analysis unit 117 performs image analysis processing on the acquired image of the imaging region r11, and thus generates data indicating a luminance distribution in the imaging region r11 (hereinafter simply referred to as a "luminance distribution"). Then, the analysis unit 117 outputs the generated luminance distribution of the imaging region r11 to the auxiliary light control unit 113.

The auxiliary light control unit 113 is a component for controlling an operation (controlling, for example, a light emission timing, a light emission time, and an amount of light emission of the auxiliary light emitting unit 13) of each of the plurality of auxiliary light emitting units 13 (for example, the auxiliary light emitting units 13a and 13b) emitting auxiliary light.

The auxiliary light control unit 113 controls a timing (that is, a light emission timing of each of the auxiliary light emitting units 13) at which each of the plurality of auxiliary light emitting units 13 emits auxiliary light in synchronization with a control signal supplied from the synchronization control unit 111. In such a configuration, the auxiliary light control unit 113 can cause each of the auxiliary light emitting units 13 to emit auxiliary light in synchronization with, for example, a timing at which the imaging unit 15 captures an image.

In addition, the auxiliary light control unit 113 acquires the luminance distribution of the imaging region r11 generated based on the analysis result of the image captured by the imaging unit 15 at a timing that is determined in advance from the analysis unit 117. The auxiliary light control unit 113 specifies a luminance distribution of each of the partial regions r21 in the imaging region r11 based on the acquired luminance distribution of the imaging region r11.

Then, the auxiliary light control unit 113 specifies a light intensity of auxiliary light emitted from the auxiliary light emitting unit 13 associated in advance with the partial region r21 according to the luminance distribution of each of the partial regions r21, and controls an operation of the auxiliary light emitting unit 13 according to the specified light intensity of auxiliary light.

As a specific example, in the examples shown in FIG. 3 and FIG. 5, the auxiliary light control unit 113 specifies a light intensity of auxiliary light such that a luminance of a subject in the partial region r21a captured in the image has the predetermined luminance value $I_{13}$ according to the luminance distribution of the partial region r21a. Also, for a relation between a light intensity of auxiliary light and a luminance of a subject in an image, for example, control information indicating the relation specified based on a previous experiment may be stored in a region which is readable by the auxiliary light control unit 113.

Then, the auxiliary light control unit 113 controls an operation of the auxiliary light emitting unit 13a associated with the partial region r21a (that is, auxiliary light is emitted toward the partial region r21a) such that auxiliary light of the specified light intensity is emitted toward the partial region r21a.

Similarly, the auxiliary light control unit 113 specifies a light intensity of auxiliary light such that a luminance of a subject in the partial region r21b captured in the image has the predetermined luminance value $I_{13}$ according to the luminance distribution of the partial region r21b. Then, the auxiliary light control unit 113 controls an operation of the auxiliary light emitting unit 13b associated with the partial region r21b such that auxiliary light of the specified light intensity is emitted toward the partial region r21b.

Also, a region (that is, the partial region r21) in the imaging region r11 toward which the plurality of auxiliary light emitting units 13 emit auxiliary light can be specified in advance according to a relative position of the auxiliary light emitting unit 13 with respect to the imaging unit 15, an orientation of the auxiliary light emitting unit 13, and an illuminating angle of the auxiliary light emitting unit 13. That is, the auxiliary light emitting unit 13 may control an operation of the auxiliary light emitting unit 13 for each of the partial regions r21 according to a correspondence relation between the partial region r21 and the auxiliary light emitting unit 13 specified in advance based on the aforementioned method.

Also, in this case, as long as the auxiliary light control unit 113 can control a light intensity of auxiliary light that is emitted from each of the auxiliary light emitting units 13, a method thereof is not particularly limited. As a specific example, the auxiliary light control unit 113 may control a light emission time of each of the auxiliary light emitting units 13 and thus may control a light intensity of auxiliary light that is emitted from the auxiliary light emitting unit 13. In addition, as another example, the auxiliary light control unit 113 may control an amount of light emission of each of the auxiliary light emitting units 13 and thus may control a light intensity of auxiliary light that is emitted from the auxiliary light emitting unit 13. It should be noted that the auxiliary light control unit 113 controls both a light emission time of each of the auxiliary light emitting units 13 and an amount of light emission of the auxiliary light emitting units 13, and thus may control a light intensity of auxiliary light that is emitted from the auxiliary light emitting units 13.

According to the configuration described above, the imaging device 10 according to the embodiment controls a light intensity of auxiliary light that is emitted toward the partial region r21 for each of the partial regions r21 in the imaging region r11. In such a configuration, the imaging device 10 according to the embodiment can reduce nonuniformity of brightness and implement a more suitable imaging environment even under a situation in which the brightness of the imaging region is nonuniform.

Note that a timing at which the imaging device 10 controls a light intensity of auxiliary light that is emitted from each of the auxiliary light emitting units 13 is not particularly limited. As a specific example, the imaging device 10 may capture an image of the imaging region r11 for each of timings that have been determined in advance and thus may control a light intensity of auxiliary light that is emitted from each of the auxiliary light emitting units 13 according to an analysis result of the image.

In addition, as another example, the imaging device 10 may use a process that is determined in advance as a trigger, and may control a light intensity of auxiliary light that is emitted from each of the auxiliary light emitting units 13 in connection with the process. As a specific example, when an instruction that an image be captured is issued based on a user manipulation, the imaging device 10 may capture a through image of the imaging region r11 immediately before the image is captured and may control a light intensity of auxiliary light that is emitted from each of the auxiliary light emitting units 13 according to an analysis result of the through image.

Note that, while the example in which the imaging device 10 includes the auxiliary light emitting units 13 has been described in FIG. 7, the auxiliary light emitting units 13 may be provided outside the imaging device 10 as long as the auxiliary light emitting units 13 can be operated based on control of the imaging device 10. As a specific example, the auxiliary light emitting unit 13 may be configured as a so-called externally attached auxiliary light emitter.

Similarly, the imaging unit 15 may be provided outside the imaging device 10. In addition, some components of the imaging unit 15 may be provided outside the imaging device 10. As a specific example, a configuration in which an imaging element such as an image sensor of the imaging unit 15 is provided in the imaging device 10 and an optical system such as a lens is externally attached to the outside of the imaging device 10 may be used and thus the imaging device 10 may be configured as a so-called interchangeable lens type imaging device.

In addition, the imaging device 10 may dynamically calculate a correspondence relation between the partial regions r21 in the imaging region r11 and the auxiliary light emitting units 13. As a specific example, according to a relative positional relation (for example, a position and an orientation) between the imaging unit 15 and each of the auxiliary light emitting units 13, the imaging device 10 may specify the partial region r21 toward which each of the auxiliary light emitting units 13 emits auxiliary light depending on the detection result and information indicating an illuminating angle of each of the auxiliary light emitting units 13.

Also, in this case, a method of the imaging device 10 specifying a relative positional relation between the imaging unit 15 and each of the auxiliary light emitting units 13 is not particularly limited. As a specific example, the imaging device 10 may specify the relative positional relation between the imaging unit 15 and each of the auxiliary light emitting units 13 based on position information between the imaging unit 15 and each of the auxiliary light emitting units 13 that is acquired based on a technology such as a Global Positioning System (GPS). In addition, the imaging device 10 may acquire information indicating an illuminating angle of each of the auxiliary light emitting units 13 from the auxiliary light emitting unit 13.

In addition, the imaging device 10 causes the auxiliary light emitting units 13 to sequentially emit auxiliary light, captures an image of the imaging region r11 every time the auxiliary light is emitted, analyzes the image, and thus may dynamically calculate a correspondence relation between the partial regions r21 and the auxiliary light emitting units 13. In this case, the imaging device 10 may associate the partial region r21 illuminated with auxiliary light in the imaging region r11 with the auxiliary light emitting unit 13 that emits the auxiliary light.

In addition, as another example, information indicating a relative positional relation between the imaging unit 15 and each of the auxiliary light emitting units 13 may be stored in advance in a position (for example, within the imaging device 10) which is readable by the imaging device 10. In particular, when the imaging unit 15 and the auxiliary light emitting units 13 are built into the imaging device 10, a relative positional relation between the imaging unit 15 and each of the auxiliary light emitting units 13 is always constant in some cases. Therefore, it should be noted that information indicating the positional relation can be generated in advance. This is similar to an illuminating angle of each of the auxiliary light emitting units 13.

The example of the functional configuration of the imaging device 10 according to the embodiment has been described above with reference to FIG. 7.

1.3. Processes

Figure 8:
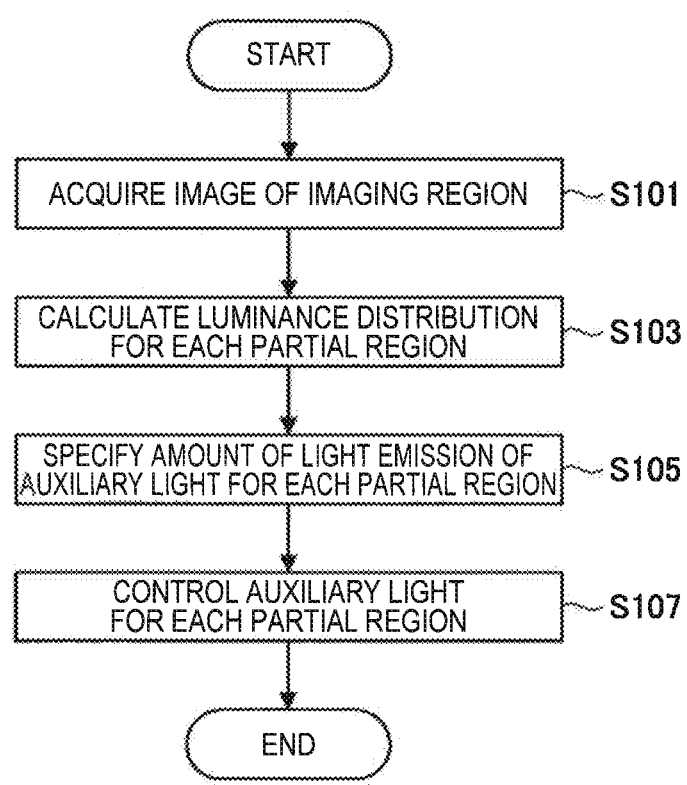
FIG. 8 is a flowchart showing an example of a flow of a series of processes of the imaging device according to the embodiment.

Next, an example of a flow of a series of processes of the imaging device 10 according to the embodiment will be described with reference to FIG. 8 with a focus particularly on an operation of the imaging device 10 controlling a light intensity of auxiliary light that is emitted from each of the auxiliary light emitting units 13. FIG. 8 is a flowchart showing an example of a flow of a series of processes of the imaging device 10 according to the embodiment.

(Step S101)

The imaging control unit 115 causes the imaging unit 15 to capture an image of the imaging region r11 at a timing that is determined in advance and outputs the captured image to the analysis unit 117. Also, in this case, for an image to be captured by the imaging unit 15, as long as the analysis unit 117 to be described below can generate a luminance distribution of the imaging region r11 based on the image, a size and a resolution of the image are not particularly limited. As a specific example, the imaging control unit 115 may cause the imaging unit 15 to capture a so-called through image (that is, a thinned image), and may output the through image to the analysis unit 117.

(Step S103)

The analysis unit 117 acquires an image of the imaging region r11 captured by the imaging unit 15 from the imaging control unit 115. The analysis unit 117 performs image analysis processing on the acquired image of the imaging region r11 and thus generates a luminance distribution of the imaging region r11. Then, the analysis unit 117 outputs the generated luminance distribution of the imaging region r1l to the auxiliary light control unit 113.

The auxiliary light control unit 113 acquires the luminance distribution of the imaging region r11 generated based on the analysis result of the image captured by the imaging unit 15 at a timing that is determined in advance from the analysis unit 117. The auxiliary light control unit 113 specifies a luminance distribution of each of the partial regions r21 in the imaging region r11 based on the acquired luminance distribution of the imaging region r11.

(Step S105)

The auxiliary light control unit 113 specifies a light intensity of auxiliary light that is emitted from the auxiliary light emitting unit 13 associated in advance with the partial region r21 according to the luminance distribution of each of the partial regions r21. As a specific example, the auxiliary light control unit 113 specifies a light intensity of auxiliary light such that a luminance of a subject in the partial region r21 captured in the image has the predetermined luminance value $I_{13}$ according to the luminance distribution of the partial region r21.

(Step S107)

Then, the auxiliary light control unit 113 controls an operation of the auxiliary light emitting unit 13 associated with the partial region r21 (that is, auxiliary light is emitted toward the partial region r21) such that auxiliary light of the specified light intensity is emitted toward each of the partial regions r21a.

According to the configuration described above, the imaging device 10 according to the embodiment controls a light intensity of auxiliary light that is emitted toward the partial region r21 for each of the partial regions r21 in the imaging region r11. In such a configuration, the imaging device 10 according to the embodiment can reduce nonuniformity of brightness and implement a more suitable imaging environment even under a situation in which the brightness of the imaging region is nonuniform.

The example of a flow of a series of processes of the imaging device 10 according to the embodiment has been described above with reference to FIG. 8 with a focus particularly on the operation of the imaging device 10 controlling a light intensity of auxiliary light that is emitted from each of the auxiliary light emitting units 13.

1.4. Modified Examples

Next, modified examples of the imaging device 10 according to the embodiment will be described.

1.4.1. Modified Example 1: Application Example of Imaging Device

Figure 9:
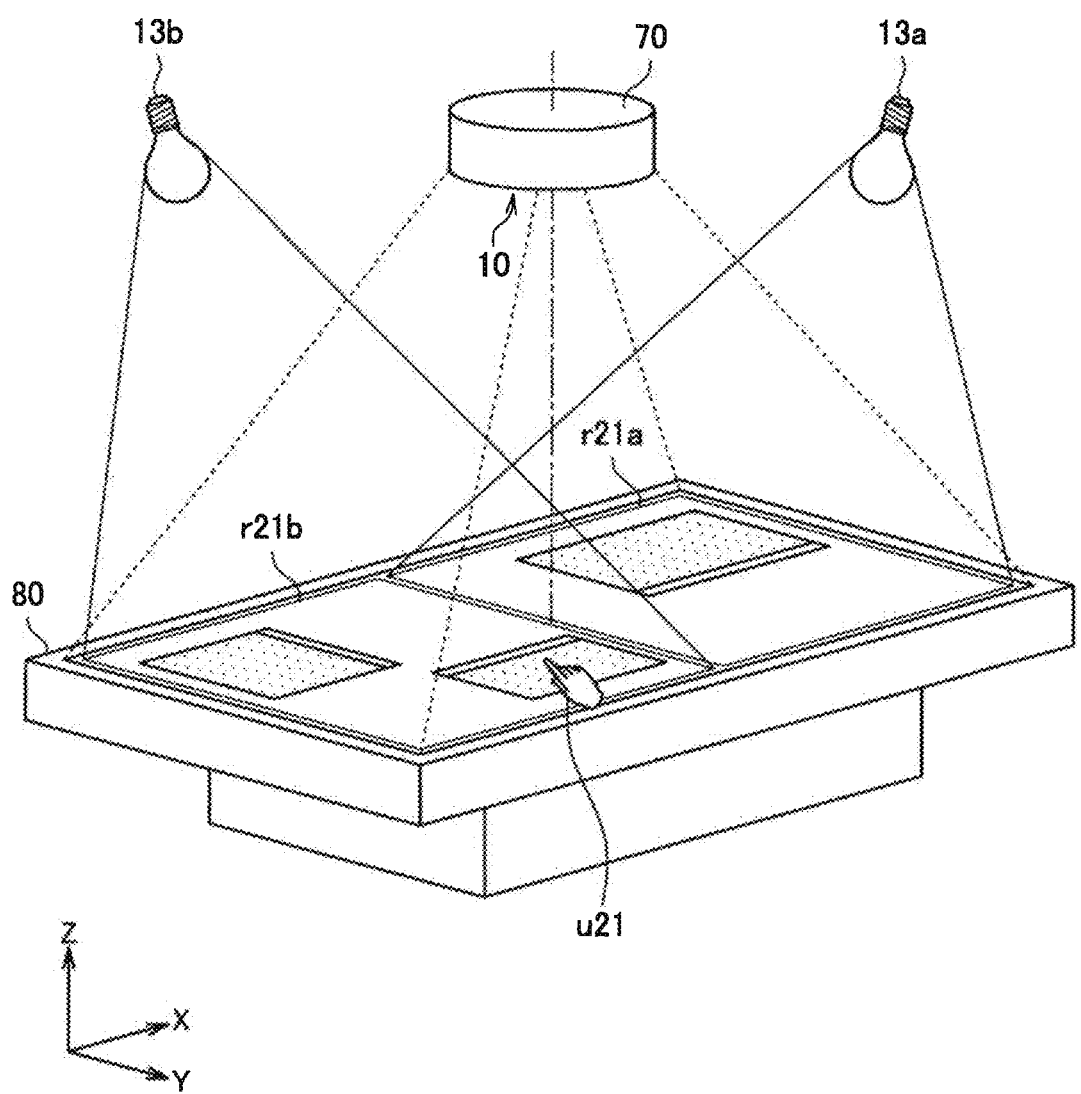
FIG. 9 is an explanatory diagram for describing an overview of an information processing device according to Modified Example 1 of the embodiment.

First, as Modified Example 1, an example of an information processing device to which the imaging device 10 according to the embodiment is applied will be described with reference to FIG. 9. FIG. 9 is an explanatory diagram for describing an overview of an information processing device according to Modified Example 1. Also, in FIG. 9, an x direction and a y direction indicate different directions in a horizontal direction and a z direction indicates a vertical direction (that is, a height direction). In addition, as Modified Example 1, an information processing device to be described below is referred to as an "information processing device 70" below in some cases.

The information processing device 70 projects a manipulation screen on which various types of content are displayed to a predetermined region and thus presents the manipulation screen to a user. For example, in the example shown in FIG. 9, the information processing device 70 projects the manipulation screen on a projection plane 80 using a top board of a table (hereinafter referred to as a "table top" in some cases) that extends in a horizontal direction as the projection plane 80.

In addition, the information processing device 70 causes the imaging device to capture an image on the projection plane 80 on which the manipulation screen is projected, analyzes the captured image, and thus recognizes content manipulated by a manipulation body u21 such as a user's hand or finger with respect to the manipulation screen displayed on the projection plane 80.

Specifically, the information processing device 70 extracts an object having a characteristic shape or a moving body on the projection plane 80 (for example, the table top) of the manipulation screen as the manipulation body u21 from the image captured by the imaging device, and may recognize manipulation content based on an operation of the extracted manipulation body u21. In addition, as another example, the information processing device 70 may extract an object that is in the projected manipulation screen as the manipulation body u21 based on a difference between the image captured by the imaging device and the manipulation screen that is projected on the projection plane 80.

In addition, a so-called distance measuring sensor (for example, a depth sensor) is provided in the information processing device 70, a detection result of the distance measuring sensor is combined with an analysis result of the image captured by the imaging device, and thus content manipulated by the manipulation body u21 with respect to the manipulation screen may be recognized. For example, the information processing device 70 can recognize a relative positional relation between the projection plane 80 and the manipulation body u21 in the z direction based on a difference between a distance to the projection plane 80 and a distance to the manipulation body u21 that are detected by the distance measuring sensor.

Then, the information processing device 70 updates the manipulation screen based on the recognized manipulation content and projects the updated manipulation screen on the projection plane 80 (for example, the table top).

The information processing device 70 described above may apply the imaging device 10 according to the above-described embodiment as an imaging device configured to capture an image for detecting the manipulation body u21 on the manipulation screen projected on the projection plane 80.

For example, FIG. 9 shows an example in which the imaging device 10 according to the embodiment is applied to the information processing device 70 described above.

In the example shown in FIG. 9, the information processing device 70 divides a region on the projection plane 80 (for example, the table top) on which the manipulation screen is projected into a plurality of partial regions r21a and r21 and associates the auxiliary light emitting units 13a and 13b with the partial regions r21a and r21. Specifically, the auxiliary light emitting unit 13a is provided to emit auxiliary light toward the partial region r21a and the auxiliary light emitting unit 13b is provided to emit auxiliary light toward the partial region r21b.

Also, an imaging region of the imaging device 10 includes at least a region in which the information processing device 70 projects the manipulation screen. Therefore, the imaging region of the imaging device 10 includes the plurality of partial regions r21a and r21.

In addition, in the example shown in FIG. 9, in order for the configuration to be easily understood, the auxiliary light emitting units 13a and 13b are provided outside the information processing device 70 (consequently the imaging device 10). However, it should be noted that the auxiliary light emitting units 13a and 13b may be built into the information processing device 70.

In such a configuration, the information processing device 70 according to Modified Example 1 controls an operation of the auxiliary light emitting unit 13 associated with the partial region r21 based on a luminance distribution for each of the partial regions r21 captured by the imaging device 10. Accordingly, the information processing device 70 can individually control light intensities of auxiliary light beams emitted toward the partial regions r21a and r21b in the manipulation screen projected on the projection plane 80.

In particular, in the information processing device 70 according to Modified Example 1, a position of the manipulation body u21 is sequentially changed, and brightness of the manipulation body u21 captured in the image also changes according to the change (in particular, a change of a distance from the imaging device 10) of the position of the manipulation body u21. Even under such a situation, by applying the imaging device 10 according to the embodiment to the information processing device 70, brightness (for example, luminance) of the manipulation body u21 captured in the image can be sequentially controlled such that it has an appropriate luminance value. That is, since the information processing device 70 according to Modified Example 1 can maintain brightness (in other words, exposure) of the manipulation body u21 captured in the image within a predetermined range even under a situation in which a position of the manipulation body u21 is sequentially changed, it is possible to prevent recognition accuracy of the manipulation body u21 from deteriorating.

1.4.2. Modified Example 2: Control Example of Auxiliary Light

Next, as Modified Example 2, an example of controlling, performed by the imaging device 10, light intensities of auxiliary light beams emitted from the auxiliary light emitting units 13 when the plurality of auxiliary light emitting units 13 emit auxiliary light toward one partial region r21 will be described.

It is generally known that, when light beams are emitted toward a subject in a plurality of directions, an effect enabling a shadow of the subject formed by light beams to have a lower gray scale value is obtained. In the imaging device 10 according to Modified Example 2, such an effect is used and thus capturing an image in which a shadow of the subject u11 formed according to emission of auxiliary light from the auxiliary light emitting unit 13 is reduced in size is implemented.

Figure 10:
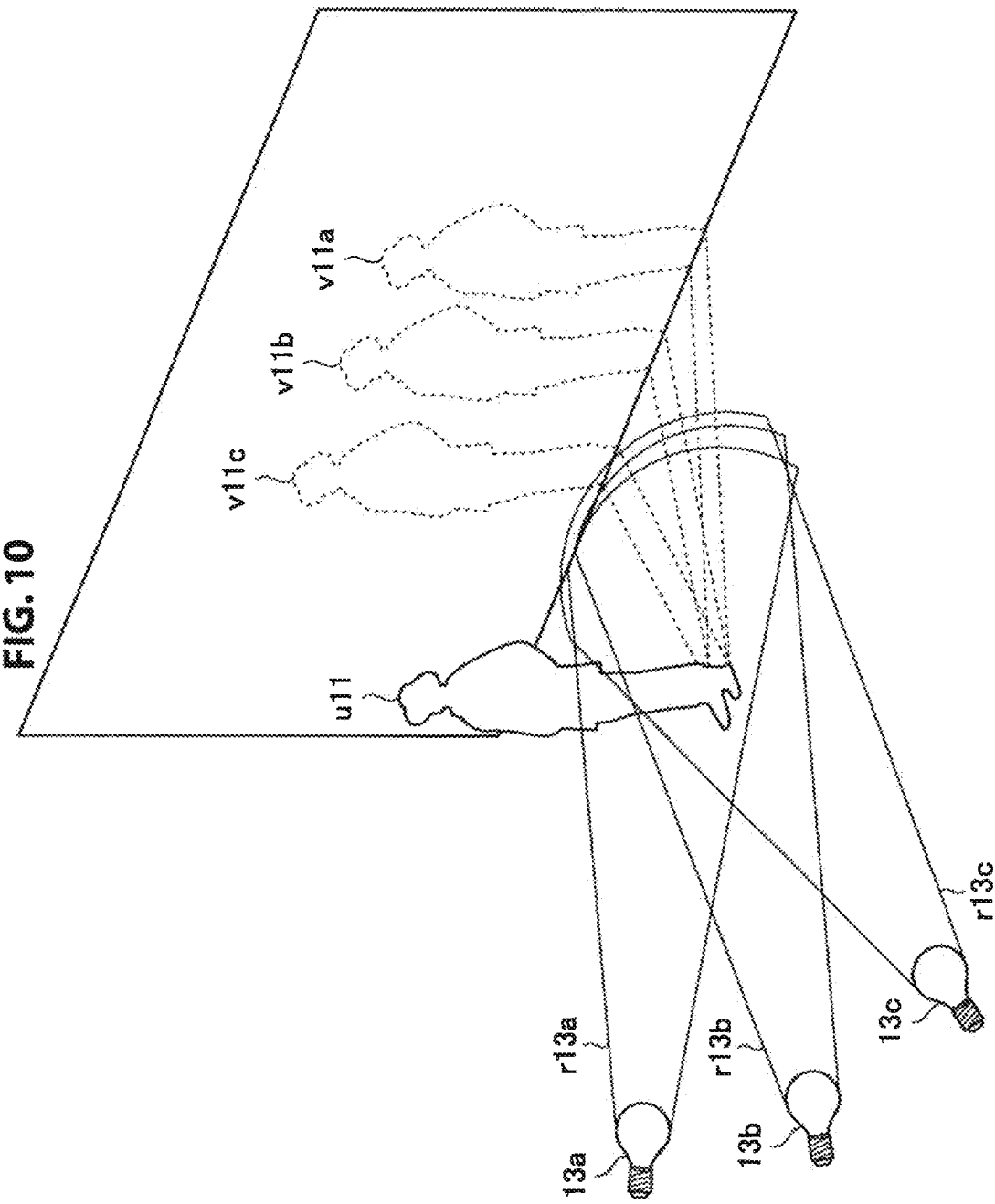
FIG. 10 is an explanatory diagram for describing an overview of an imaging device according to Modified Example 2 of the embodiment.

For example, FIG. 10 is an explanatory diagram for describing an overview of the imaging device 10 according to Modified Example 2 and shows an example in which the plurality of auxiliary light emitting units 13 are associated with one partial region r21. Also, FIG. 10 schematically shows a state in which the plurality of auxiliary light emitting units 13a to 13c associated with the partial region r21 emit auxiliary light toward the subject u11 that is in one partial region r21.

In FIG. 10, a reference sign r13a schematically indicates a region in which auxiliary light is emitted from the auxiliary light emitting unit 13a, that is, a region illuminated with auxiliary light that is emitted from the auxiliary light emitting unit 13a. Similarly, a reference sign r13b indicates a region in which auxiliary light is emitted from the auxiliary light emitting unit 13b. In addition, a reference sign r13c indicates a region in which auxiliary light is emitted from the auxiliary light emitting unit 13c.

In addition, in FIG. 10, a reference sign v11a schematically indicates a shadow of the subject u11 that is formed when auxiliary light is emitted from the auxiliary light emitting unit 13a toward the subject u11. Similarly, a reference sign v11b schematically indicates a shadow of the subject u11 that is formed when auxiliary light is emitted from the auxiliary light emitting unit 13b toward the subject u11. In addition, a reference sign v11c schematically indicates a shadow of the subject u11 that is formed when auxiliary light is emitted from the auxiliary light emitting unit 13c toward the subject u11. Note that, when shadows v11a to v11c are not particularly distinguished, they will be simply referred to as a "shadow v11" below in some cases.

As shown in FIG. 10, in the imaging device 10 according to Modified Example 2, the plurality of auxiliary light emitting units 13 associated with one partial region r21 are provided to emit auxiliary light toward the one partial region r21 in different directions. Then, the imaging device 10 according to Modified Example 2 analyzes the captured image of the imaging region r11 and thus controls light intensities of auxiliary light beams that are emitted from the plurality of auxiliary light emitting units 13 associated with the one partial region r21 in the imaging region r11 based on the analysis result.

As a specific example, the imaging device 10 analyzes the shadows v11a to v11c of the subject u11 captured in the image of the imaging region r11 according to emission of auxiliary light from the plurality of auxiliary light emitting units 13a to 13c and thus controls operations of the auxiliary light emitting units 13a to 13c.

In this case, the imaging device 10 analyzes the image of the imaging region r11 captured by the imaging unit 15 and thus extracts the shadow v11 of the subject u11 that is in the partial region r21 from the image for each of the partial regions r21.

Also, as long as the imaging device 10 can extract the shadow v11 of the subject u11, a method thereof is not particularly limited. As a specific example, the imaging device 10 extracts the subject u11 from the image based on a shape characteristic of the subject that is an extraction target, and may extract a region similar to the extracted subject u11 as the shadow v11 of the subject u11.

In addition, in the subject u11 captured in the image and the shadow v11 of the subject u11, the subject u11 toward which auxiliary light is directly emitted is imaged more brightly than the shadow vi formed when auxiliary light is blocked by the subject u11. Therefore, when a plurality of regions (that is, regions corresponding to the subject u11 and the shadow v11 of the subject u11) that are similar to a shape of the subject u11 in the image are extracted, the imaging device 10 may identify a region having the highest luminance among the plurality of regions as a region indicating the subject u11. Also, in this case, it should be noted that the imaging device 10 may recognize a region other than the region indicating the subject u11 among the extracted plurality of regions as a region indicating the shadow v11 of the subject u11.

When the shadow v11 of the subject u11 is extracted for each of the partial regions r21, the imaging device 10 controls light intensities of auxiliary light beams emitted from the auxiliary light emitting units 13 such that a difference between depths of the extracted shadows v11 becomes a previously determined threshold value or less (in other words, become substantially the same). Also, in this case, the imaging device 10 may recognize any auxiliary light that is emitted from any of the plurality of auxiliary light emitting units 13 and forms each of the plurality of extracted shadows v11 according to a relative positional relation between the partial region r21 and the plurality of auxiliary light emitting units 13.

Then, for example, when the shadow v11a is darker (that is, luminance thereof is lower) than the other shadows v11b and v11 among the plurality of shadows v11a to v11c, the imaging device 10 limits a light intensity of auxiliary light that is emitted from the auxiliary light emitting unit 13a corresponding to the shadow v11a. Also, in this case, in order to maintain a total amount of light intensities of auxiliary light beams that are emitted toward the partial region v21, the imaging device 10 may increase light intensities of auxiliary light beams that are emitted from the other auxiliary light emitting units 13b and 13c.

Similarly, for example, when the shadow v11a is brighter (that is, luminance thereof is higher) than the other shadows v11b and v11c, the imaging device 10 increases a light intensity of auxiliary light that is emitted from the auxiliary light emitting unit 13a corresponding to the shadow v11a among the plurality of shadows v11a to v11c. Also, in this case, in order to maintain a total amount of light intensities of auxiliary light beams that are emitted toward the partial region v21, the imaging device 10 may limit light intensities of auxiliary light beams that are emitted from the other auxiliary light emitting units 13b and 13c.

In such a configuration, the imaging device 10 according to Modified Example 2 can capture an image in which the shadow v11 of the subject u11 that is formed according to emission of auxiliary light from the plurality of auxiliary light emitting units 13 has a lower gray scale value.

Also, the imaging device 10 according to the above-described Modified Example 2 may be applied to the information processing device 70 according to the above-described Modified Example 1 (refer to FIG. 9). For example, FIG. 11 is an explanatory diagram for describing an overview of the imaging device 10 according to Modified Example 2 and shows an example in which the imaging device 10 is applied to the information processing device 70 according to the above-described Modified Example 1.

Figure 11:
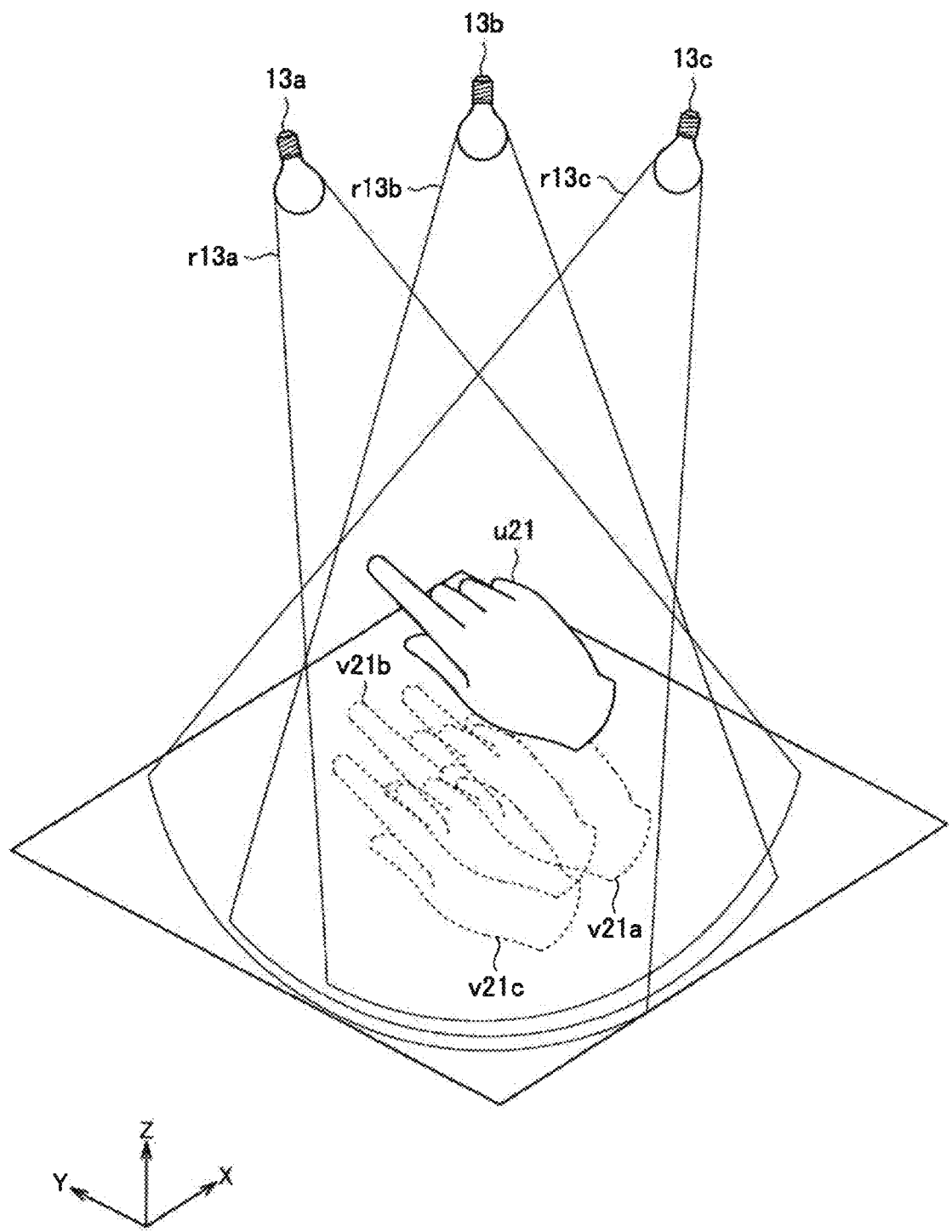
FIG. 11 is an explanatory diagram for describing an overview of an imaging device according to Modified Example 2 of the embodiment.

Similarly to the example shown in FIG. 10, in FIG. 11, the reference signs r13a to 13c schematically indicate regions in which auxiliary light is emitted from the auxiliary light emitting units 13a to 13c.

In addition, in FIG. 11, a reference sign v21a schematically indicates a shadow of the manipulation body u21 that is formed on the projection plane 80 when auxiliary light is emitted from the auxiliary light emitting unit 13a toward the manipulation body u21 (that is, the subject). Similarly, a reference sign v21b schematically indicates a shadow of the manipulation body u21 that is formed on the projection plane 80 when auxiliary light is emitted from the auxiliary light emitting unit 13b toward the manipulation body u21. In addition, a reference sign v21c schematically indicates a shadow of the manipulation body u21 that is formed on the projection plane 80 when auxiliary light is emitted from the auxiliary light emitting unit 13c toward the manipulation body u21. Note that, when shadows v21a to v21c are not particularly distinguished, they will be simply referred to as a "shadow v21" below in some cases.

Similarly to the example shown in FIG. 10, in the example shown in FIG. 11, the imaging device 10 analyzes the captured image of the imaging region r11 and thus extracts regions indicating the manipulation body u21 and the shadow v11 of the manipulation body u21 based on a shape characteristic of the manipulation body serving as a detection target. Then, the imaging device 10 may specify a region corresponding to the shadow v11 of the manipulation body u21 based on luminances of the extracted regions of the manipulation body u21 and the shadow v11 of the manipulation body u21.

In addition, as another example, the imaging device 10 may specify a region corresponding to the shadow v11 of the manipulation body u21 from the extracted regions of the manipulation body u21 and the shadow v11 of the manipulation body u21 according to a detection result of a distance measuring sensor such as a depth sensor.

Specifically, the manipulation body u21 is interposed between the information processing device 70 and the projection plane 80. Therefore, when the distance measuring sensor is provided in the information processing device 70, the manipulation body u21 is at a position closer to the distance measuring sensor than the projection plane 80 is. Therefore, between the extracted regions indicating the manipulation body u21 and the shadow v11 of the manipulation body u21, the imaging device 10 may identify a region that is at a position closer to the distance measuring sensor as a region corresponding to the manipulation body u21 and recognize the other region as a region corresponding to the shadow v11 of the manipulation body u21.

Also, the following operation is similar to that of the example shown in FIG. 10 described above. That is, the imaging device 10 may control light intensities of auxiliary light beams emitted from the auxiliary light emitting units 13 such that a difference between depths of the shadows v21 of the manipulation body u21 extracted for each of the partial regions r21 becomes a previously determined threshold value or less.

In such a configuration, even in the example shown in FIG. 11, the imaging device 10 can capture an image that is formed when auxiliary light is emitted toward the manipulation body u21 and in which the shadow v21 of the manipulation body u21 has a lower gray scale value. In addition, since the shadow v21 of the manipulation body u21 is suppressed, it is possible to improve recognition accuracy of the manipulation body u21 based on the captured image performed by the information processing device 70.

The example of the imaging device 10 according to Modified Example 2 has been described above with reference to FIG. 10 and FIG. 11.

1.4.3. Modified Example 3: Control Example of Auxiliary Light

Next, as Modified Example 3, another example of controlling, by the imaging device 10, auxiliary light emitted from the auxiliary light emitting unit 13 when the plurality of auxiliary light emitting units 13 emit auxiliary light toward one partial region r21 will be described. In the above-described Modified Example 2, the imaging device 10 controls operations of the plurality of auxiliary light emitting units 13 associated with one partial region r21 based on an analysis result of the captured imaging region r11.

On the other hand, the imaging device 10 according to Modified Example 3 detects a relative position of the subject u11 with respect to the imaging unit 15 and controls light intensities of auxiliary light beams that are emitted from the plurality of auxiliary light emitting units 13 based on the detection result of the relative position.

Specifically, the imaging device 10 specifies a relative position of the subject u11 in the partial region r21 with respect to the imaging unit 15 for each of the partial regions r21 in the imaging region r11 based on a detection result of a distance measuring sensor (for example, a depth sensor).

In addition, the imaging device 10 specifies a relative position between the subject u11 and the auxiliary light emitting unit 13 based on a relative position between the imaging unit 15 and the subject u11 in the partial region r21 and a relative position between the imaging unit 15 and the auxiliary light emitting unit 13 associated with the partial region r21.

Also, a method of the imaging device 10 specifying a relative positional relation between the imaging unit 15 and each of the auxiliary light emitting units 13 is not particularly limited. As a specific example, the imaging device 10 may specify a relative positional relation between the imaging unit 15 and each of the auxiliary light emitting units 13 based on position information between the imaging unit 15 and each of the auxiliary light emitting units 13 that is acquired based on a technology such as a Global Positioning System (GPS). In addition, as another example, information indicating a relative positional relation between the imaging unit 15 and each of the auxiliary light emitting units 13 may be stored in advance in a position (for example, within the imaging device 10) which is readable by the imaging device 10.

Then, the imaging device 10 controls a light intensity of auxiliary light emitted from the auxiliary light emitting unit 13 according to a relative position (in particular, a distance) between the subject u11 in the partial region r21 and the auxiliary light emitting unit 13 associated with the partial region r21. In this case, similarly to the above-described Modified Example 2, the imaging device 10 may control light intensities of the auxiliary light beams such that a difference between depths of shadows that are formed when auxiliary light beams are emitted toward the subject u11 from the auxiliary light emitting units 13 becomes a previously determined threshold value or less.

According to the configuration described above, similarly to the above-described Modified Example 2, the imaging device 10 according to Modified Example 3 can capture an image in which the shadow v11 of the subject u11 that is formed according to emission of auxiliary light from the plurality of auxiliary light emitting units 13 has a lower gray scale value.

1.5. Summary

As described above, the imaging device 10 according to the embodiment divides the imaging region r11 into the plurality of partial regions r21 and associates the different auxiliary light emitting units 13 with the partial regions r21 in advance. Then, the imaging device 10 emits auxiliary light from the auxiliary light emitting unit 13 associated with the partial region r21 toward the partial regions r21 and thus controls brightness for each of the partial regions r21.

In addition, in this case, the imaging device 10 controls a light intensity of auxiliary light that is emitted from the auxiliary light emitting unit 13 associated with the partial region r21 according to a luminance distribution of the partial region r21 in the captured image of the imaging region r11. In such a configuration, the imaging device 10 according to the embodiment can reduce nonuniformity of brightness and implement a more suitable imaging environment even under a situation in which the brightness of the imaging region is nonuniform.

Also, the imaging device 10 according to the embodiment may appropriately combine control of each of the auxiliary light emitting units 13 based on an analysis result of the image of the imaging region r11 described above and control of each of the auxiliary light emitting units 13 based on another detection device. As a specific example, the imaging device 10 may measure a distance to a subject in each of the partial regions r21 using a distance measuring sensor (for example, a depth sensor) and when the measured distance is less than a threshold value, may further limit auxiliary light that is emitted from an auxiliary light emitting unit 13 associated with a partial region r21. Also, in this case, it should be noted that the imaging device 10 may turn the auxiliary light emitting unit 13 off according to the measured distance to the subject.

2. Second Embodiment

2.1. Overview

Next, the imaging device 10 according to a second embodiment will be described. The imaging device 10 according to the above-described first embodiment controls a light intensity of auxiliary light emitted from the auxiliary light emitting unit 13 associated with each of the plurality of partial regions r21 in the imaging region r11 based on a luminance distribution of an image of the imaging region r11 captured by the imaging unit 15. On the other hand, the imaging device 10 according to this embodiment uses a technology for detecting a predetermined subject such as a facial recognition technology, detects the subject in the image of the imaging region r11 captured by the imaging unit 15 for each of the partial regions r21, and thus controls an operation of each of the auxiliary light emitting units 13 according to the detection result.

Hereinafter, an overview of the imaging device 10 according to the embodiment will be described with reference to FIG. 12 to FIG. 15. FIG. 12 to FIG. 15 are explanatory diagrams for describing an overview of the imaging device 10 according to the embodiment. Also, in this description, as shown in FIG. 2, the imaging device 10 divides the imaging region r11 into a plurality of partial regions r21a and r21b, and emits auxiliary light toward the partial regions r21a and r21b using different auxiliary light emitting units 13a and 13b. In addition, a case in which the subject u11 is in the partial region r21a and the subject u12 is in the partial region r21b will be described.

The imaging device 10 according to the embodiment sequentially changes light intensities of auxiliary light beams emitted toward the partial regions r21, acquires an image of the imaging region r11 for each of the changed light intensities, and thus performs a process of detecting the subject for each of the partial regions r21. For example, FIG. 12 to FIG. 14 schematically show examples of images of the imaging region r11 that are captured according to light intensities of auxiliary light beams emitted from the auxiliary light emitting units 13a and 13b.

Figure 12:
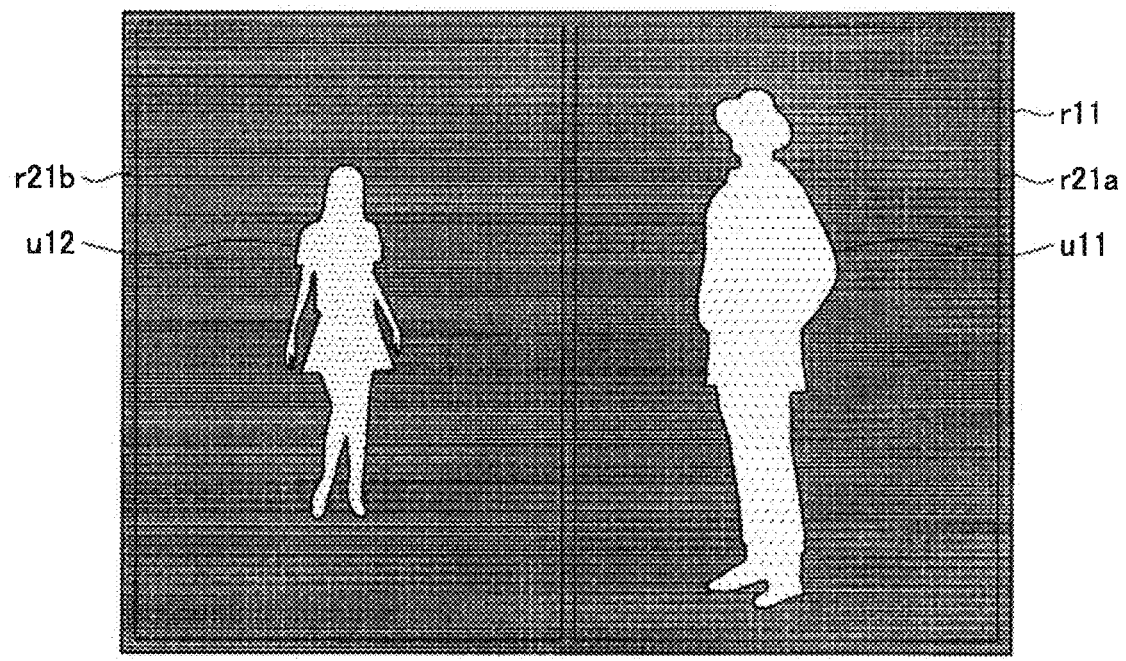
FIG. 12 is an explanatory diagram for describing an overview of an imaging device according to a second embodiment of the present disclosure.
Figure 13:
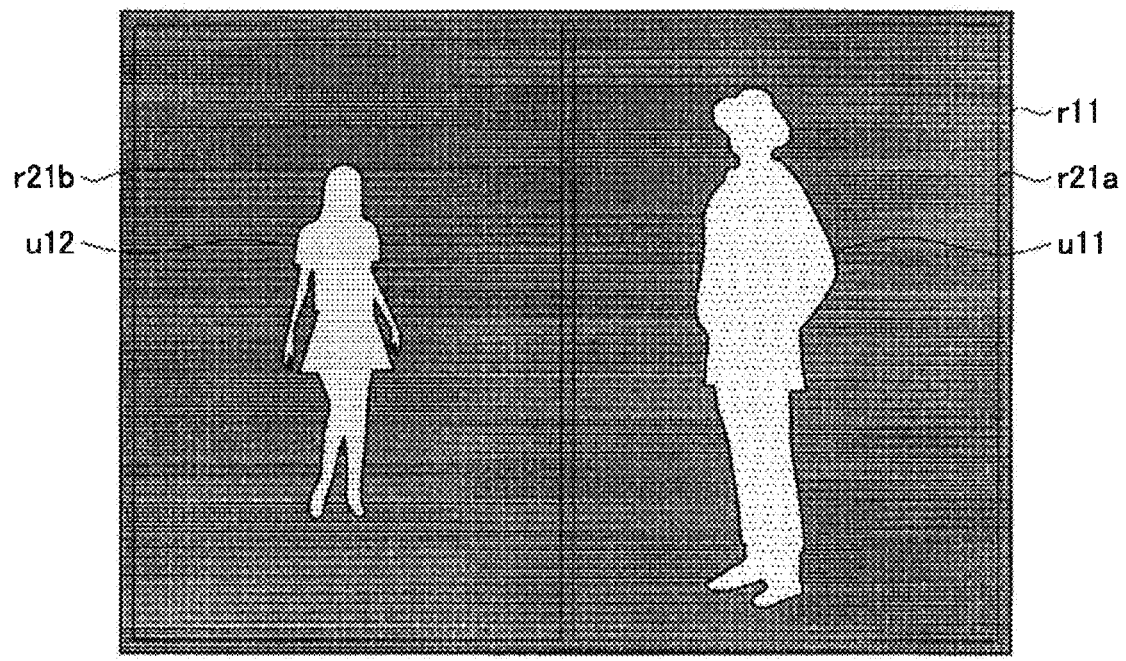
FIG. 13 is an explanatory diagram for describing an overview of the imaging device according to the embodiment.

Specifically, FIG. 12 shows an example in which light intensities of auxiliary light beams emitted from the auxiliary light emitting units 13a and 13b are controlled such that they become greater. In the example shown in FIG. 12, auxiliary light of an appropriate light intensity is emitted toward the subject u12 in the partial region r21b from the auxiliary light emitting unit 13b. Therefore, the imaging device 10 can detect the subject u12 in the image based on an analysis result of the partial region r21b in the captured image.

On the other hand, the subject u11 is at a position closer to the imaging device 10 than the subject u12 is. Therefore, the subject u11 is illuminated more brightly than the subject u12 according to auxiliary light emitted from the auxiliary light emitting unit 13a. Under such a situation, for example, luminance of a region of the subject u11 in the captured image is saturated and the imaging device 10 has difficulty in detecting the subject u11 in the image.

Next, an example shown in FIG. 13 will be described. The example shown in FIG. 13 shows a case in which light intensities of auxiliary light beams emitted from the auxiliary light emitting units 13a and 13b are limited further than those of the example shown in FIG. 12. In the example shown in FIG. 13, auxiliary light of an appropriate light intensity is emitted toward the subject u11 in the partial region r21a from the auxiliary light emitting unit 13a. Therefore, the imaging device 10 can detect the subject u11 in the image based on an analysis result of the partial region r21a in the captured image.

On the other hand, the subject u12 is at a position further from the imaging device 10 than the subject u11 is. Therefore, the subject u12 is illuminated more darkly than the subject u11 according to auxiliary light emitted from the auxiliary light emitting unit 13b. Under such a situation, for example, the imaging device 10 fails to obtain a luminance sufficient for determining a region of the subject u12 in the captured image and has difficulty in detecting the subject u12 in the image.

Next, an example shown in FIG. 14 will be described. The example shown in FIG. 14 shows a case in which light intensities of auxiliary light beams emitted from the auxiliary light emitting units 13a and 13b are limited further those of the example shown in FIG. 13. The example shown in FIG. 14 shows a state in which auxiliary light of a sufficient light intensity is emitted toward neither of the subject u11 in the partial region r21a nor the subject u12 in the partial region r21b. Therefore, the imaging device 10 fails to obtain a luminance sufficient for determining regions of both of the subjects u11 and u12 in the captured image and has difficulty in detecting the subjects u11 and u12 in the image.

Then, the imaging device 10 controls light intensities of auxiliary light beams emitted from the auxiliary light emitting units 13 associated with the partial regions r21 based on the analysis results of the images shown in FIG. 12 to FIG. 14 according to a detection result of a subject for each of the partial regions r21. FIG. 15 is an explanatory diagram for describing an overview of the imaging device 10 according to the embodiment and shows an example of a control result of the auxiliary light emitting units 13 based on the analysis result of the images shown in FIG. 12 to FIG. 14.

As described above, the imaging device 10 detects the subject u11 in the partial region r21a based on an analysis result of the image of the imaging region r11 shown in FIG. 13 but has difficulty in detecting the subject u11 from an analysis result of the other image. Therefore, the imaging device 10 sets a light intensity of auxiliary light that is emitted from the auxiliary light emitting unit 13a toward the partial region r21a as a light intensity (that is, a light intensity at which the subject u11 is detected) at which the image shown in FIG. 13 is captured.

Similarly, the imaging device 10 detects the subject u12 in the partial region r21b based on an analysis result of the image of the imaging region r11 shown in FIG. 12 but has difficulty in detecting the subject u12 from an analysis result of the other image. Therefore, the imaging device 10 sets a light intensity of auxiliary light that is emitted from the auxiliary light emitting unit 13b toward the partial region r21b as a light intensity (that is, a light intensity at which the subject u12 is detected) at which the image shown in FIG. 12 is captured.

According to such control, as shown in FIG. 15, the imaging device 10 can emit auxiliary light of an appropriate light intensity toward the subject u11 in the partial region r21a and the subject u12 in the partial region r21b.

As described above, the imaging device 10 according to the embodiment divides the imaging region r11 into the plurality of partial regions r21 and associates the different auxiliary light emitting units 13 with the partial regions r21 in advance. Then, the imaging device 10 emits auxiliary light from the auxiliary light emitting unit 13 associated with the partial region r21 toward the partial regions r21 and thus controls brightness for each of the partial regions r21.

In addition, in this case, the imaging device 10 uses a technology for detecting a predetermined subject such as a facial recognition technology, detects the subject in the image of the imaging region r11 captured by the imaging unit 15 for each of the partial regions r21, and thus controls an operation of each of the auxiliary light emitting units 13 according to the detection result.

Specifically, the imaging device 10 sequentially changes light intensities of auxiliary light beams emitted toward the partial regions r21, acquires an image of the imaging region r11 for each of the changed light intensities, and thus performs a process of detecting a subject for each of the partial regions r21. Then, the imaging device 10 sets a light intensity of auxiliary light that is emitted from the auxiliary light emitting units 13 associated with each of the partial regions r21 as a light intensity at which the subject in the partial region r21 is detected.

According to such control, the imaging device 10 according to the embodiment can perform control such that auxiliary light of an appropriate light intensity is emitted toward subjects in the partial regions r21. That is, the imaging device 10 according to the embodiment can reduce nonuniformity of brightness and implement a more suitable imaging environment even under a situation in which the brightness of the imaging region is nonuniform.

In addition, the imaging device 10 according to the embodiment controls a light intensity of auxiliary light that is emitted from the auxiliary light emitting unit 13 according to the detection result of the subject that is determined in advance. Therefore, the imaging device 10 can control a light intensity of auxiliary light that is emitted from each of the auxiliary light emitting units 13 such that the subject serving as a detection target is illuminated at appropriate brightness independently of brightness of another subject different from the target subject.

Also, as long as the imaging device 10 sequentially changes light intensities of auxiliary light beams emitted toward the partial regions r21 and thus can specify a light intensity of auxiliary light according to a detection result of a subject in the partial region r21 based on an image captured whenever the light intensity is changed, a method thereof is not particularly limited. For example, the imaging device 10 may capture an image of the imaging region r11 while a light intensity of auxiliary light is scanned from a brighter setting to a darker setting (or from a darker setting to a brighter setting), and may specify a light intensity of auxiliary light according to a detection result of a subject based on the captured image.

In addition, in the example described above, in order for the description to be easily understood, the imaging device 10 emits auxiliary light of the same light intensity toward the partial regions r21 when it is confirmed whether a subject in each of the partial regions r21 can be detected. However, as long as the imaging device 10 confirms whether a subject is detected for each of the partial regions r21 and can specify a light intensity of auxiliary light according to the detection result, auxiliary light of the same light intensity is not necessarily emitted toward the partial regions r21.

The overview of the imaging device 10 according to the embodiment has been described above with reference to FIG. 12 to FIG. 15. In addition, the imaging device 10 according to the embodiment will be described below in further detail.

2.2. Functional Configuration

Figure 16:
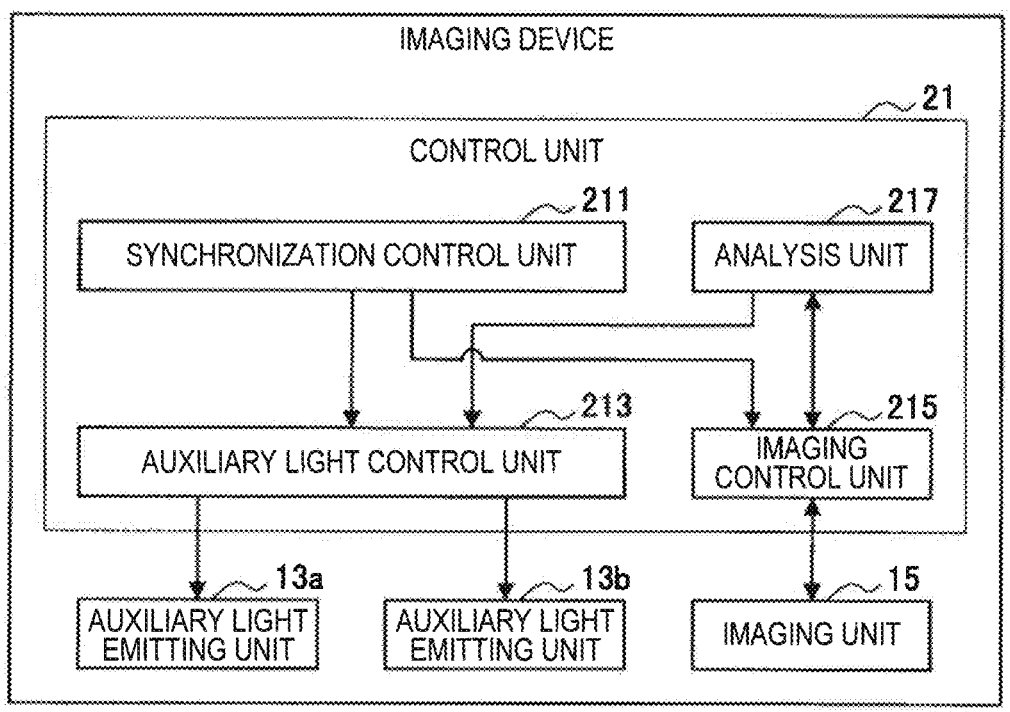
FIG. 16 is a block diagram showing an example of a functional configuration of the imaging device according to the embodiment.

First, an example of a functional configuration of the imaging device 10 according to the embodiment will be described with reference to FIG. 16. FIG. 16 is a block diagram showing an example of a functional configuration of the imaging device 10 according to the embodiment.

As shown in FIG. 16, the imaging device 10 according to the embodiment includes a control unit 21, the plurality of auxiliary light emitting units 13, and the imaging unit 15. In addition, the control unit 21 includes a synchronization control unit 211, an auxiliary light control unit 213, an imaging control unit 215, and an analysis unit 217. Also, in the imaging device 10 according to the embodiment, operations of components of the control unit 21 are partially different from those of the imaging device 10 according to the above-described first embodiment, and the auxiliary light emitting units 13 and the imaging unit 15 are similar to those of the imaging device 10 according to the above-described first embodiment. Therefore, in this description, among the components of the imaging device 10 according to the embodiment, parts different from those of the imaging device 10 according to the above-described first embodiment will be described particularly on a focus, and other components will not be described in detail.

Note that, in this description, similarly to the examples shown in FIG. 2 to FIG. 6 described above, the imaging device 10 including the auxiliary light emitting units 13a and 13b as the plurality of auxiliary light emitting units 13 will be described. In addition, the auxiliary light emitting unit 13a provided to emit auxiliary light toward the partial region r21a in the imaging region r11 (that is, an installation position, an orientation, an illuminating angle of auxiliary light, and the like are set) is described. Similarly, the auxiliary light emitting unit 13b is provided to emit auxiliary light toward the partial region r21b in the imaging region r11.

The synchronization control unit 211 is similar to the synchronization control unit 11 according to the above-described first embodiment. That is, the synchronization control unit 211 generates a synchronization signal for connecting (for example, synchronizing) a timing at which the imaging unit 15 captures an image and a timing at which each of the plurality of auxiliary light emitting units 13 emits auxiliary light. Then, the synchronization control unit 211 supplies the generated synchronization signal to the imaging control unit 215 and the auxiliary light control unit 213 which will be described below.

The imaging control unit 215 corresponds to the imaging control unit 115 according to the above-described first embodiment and is a component for controlling an operation of the imaging unit 15 capturing an image (controlling, for example, an imaging timing, an imaging time, and exposure conditions).

The imaging control unit 215 controls an imaging timing of the imaging unit 15 in synchronization with a control signal supplied from the synchronization control unit 211. In this case, the imaging control unit 215 may control an imaging time of the imaging unit 15 based on the supplied control signal. In such a configuration, the imaging control unit 215 can cause the imaging unit 15 to capture an image in synchronization with, for example, a timing at which the auxiliary light emitting unit 13 emits auxiliary light.

In addition, the imaging control unit 215 causes the imaging unit 15 to capture an image of the imaging region r11 based on an instruction from the analysis unit 217 to be described below and outputs the captured image to the analysis unit 217. Note that, in this case, as long as the image captured by the imaging unit 15 has an amount of data with which the analysis unit 217 to be described below can perform analysis processing (for example, a process of detecting a subject in each of the partial regions r21) on the image, a size and a resolution of the image are not particularly limited. As a specific example, the imaging control unit 215 may cause the imaging unit 15 to capture a so-called through image (that is, a thinned image), and may output the through image to the analysis unit 217.

The analysis unit 217 causes the auxiliary light control unit 213 to control operations of the auxiliary light emitting units 13 to be described below such that, at a timing that is determined in advance, light intensities are sequentially changed and auxiliary light beams are emitted from the auxiliary light emitting units 13. In addition, the analysis unit 217 causes the imaging control unit 215 to control an operation of the imaging unit 15 such that, for each of the changed light intensities of the auxiliary light beams, the imaging unit 15 captures an image of the imaging region r11 (in other words, images of the partial regions r21). Then, the analysis unit 217 acquires a series of images of the imaging region r11 captured for each light intensity of auxiliary light emitted from the auxiliary light emitting units 13 from the imaging control unit 215.

The analysis unit 217 analyzes the acquired series of images of the imaging region r11 and thus performs a process of detecting a subject in the partial region r21 for each of the partial regions r21.

Also, as long as the analysis unit 217 can detect a subject of a kind that is determined in advance from the captured image, a kind of the subject serving as a detection target and details (in other words, a method of detecting a subject) of a process of detecting the subject are not particularly limited. For example, when the subject serving as a detection target is a human (that is, a human body), the analysis unit 217 may specify a subject in the image based on a detection result of a human part having a characteristic shape (for example, a face, hands, and arms).

Also, when auxiliary light of an appropriate light intensity is not emitted toward the subject, the analysis unit 217 has difficulty in detecting the subject in the image to be analyzed. For example, when a light intensity of auxiliary light emitted toward the subject is too large, a luminance of the subject in the image is saturated and the analysis unit 217 has difficulty in detecting the subject in the image. In addition, as another example, when a light intensity of auxiliary light emitted toward the subject is too small, the analysis unit 217 fails to obtain a luminance sufficient for determining a region of the subject in the captured image and has difficulty in detecting the subject in the image.

Using such a characteristic, the analysis unit 217 specifies a light intensity of auxiliary light when the subject in the partial region r21 is detected for each of the partial regions r21 based on a result obtained by performing a process of detecting the subject in the acquired series of images of the imaging region r11. Then, the analysis unit 217 outputs information indicating a light intensity of auxiliary light specified for each of the partial regions r21 to the auxiliary light control unit 213.

The auxiliary light control unit 213 corresponds to the auxiliary light control unit 213 according to the above-described first embodiment, and is a component for controlling an operation (controlling, for example, a light emission timing, a light emission time, and an amount of light emission of the auxiliary light emitting unit 13) of each of the plurality of auxiliary light emitting units 13 (for example, the auxiliary light emitting units 13a and 13b) emitting auxiliary light.

The auxiliary light control unit 213 controls a timing (that is, a light emission timing of each of the auxiliary light emitting units 13) at which each of the plurality of auxiliary light emitting units 13 emits auxiliary light in synchronization with a control signal supplied from the synchronization control unit 211. In such a configuration, the auxiliary light control unit 213 can cause each of the auxiliary light emitting units 13 to emit auxiliary light in synchronization with, for example, a timing at which the imaging unit 15 captures an image.

In addition, the auxiliary light control unit 213 causes the auxiliary light emitting units 13 to sequentially change light intensities of auxiliary light beams to be emitted according to an instruction from the analysis unit 217 and to emit auxiliary light for each of the changed light intensities.

In addition, the auxiliary light control unit 213 acquires information indicating a light intensity of auxiliary light for each of the partial regions r21 specified by the analysis unit 217 from the analysis unit 217. In this case, the auxiliary light control unit 213 controls a light intensity of auxiliary light emitted from the auxiliary light emitting units 13 associated with the partial region r21 according to the acquired information indicating a light intensity of auxiliary light for each of the partial regions r21.

Also, in this case, as long as the auxiliary light control unit 213 can control a light intensity of auxiliary light that is emitted from each of the auxiliary light emitting units 13, a method thereof is not particularly limited. This is similar to the imaging device 10 according to the above-described first embodiment. That is, the auxiliary light control unit 213 controls either or both of a light emission time of each of the auxiliary light emitting units 13 and an amount of light emission of the auxiliary light emitting units 13 and thus may control a light intensity of auxiliary light that is emitted from the auxiliary light emitting units 13.

According to the configuration described above, the imaging device 10 according to the embodiment controls a light intensity of auxiliary light that is emitted toward the partial region r21 for each of the partial regions r21 in the imaging region r11. In such a configuration, the imaging device 10 according to the embodiment can reduce nonuniformity of brightness and implement a more suitable imaging environment even under a situation in which the brightness of the imaging region is nonuniform.

Note that a timing at which the imaging device 10 controls a light intensity of auxiliary light that is emitted from each of the auxiliary light emitting units 13 is not particularly limited. As a specific example, the imaging device 10 may capture an image of the imaging region r11 for each of timings that have been determined in advance and thus may control a light intensity of auxiliary light that is emitted from each of the auxiliary light emitting units 13 according to an analysis result of the image.

In addition, as another example, the imaging device 10 may use a process that is determined in advance as a trigger, and may control a light intensity of auxiliary light that is emitted from each of the auxiliary light emitting units 13 in connection with the process. As a specific example, when an image is instructed to be captured based on a user manipulation, the imaging device 10 may capture a through image of the imaging region r11 immediately before the image is captured and may control a light intensity of auxiliary light that is emitted from each of the auxiliary light emitting units 13 according to an analysis result of the through image.

Note that, while the example in which the imaging device 10 includes the auxiliary light emitting units 13 has been described in FIG. 16, the auxiliary light emitting units 13 may be provided outside the imaging device 10 as long as the auxiliary light emitting units 13 can be operated based on control of the imaging device 10. As a specific example, the auxiliary light emitting unit 13 may be configured as a so-called externally attached auxiliary light emitter.

Similarly, the imaging unit 15 may be provided outside the imaging device 10. In addition, some components of the imaging unit 15 may be provided outside the imaging device 10. As a specific example, a configuration in which an imaging element such as an image sensor of the imaging unit 15 is provided in the imaging device 10 and an optical system such as a lens is externally attached to the outside of the imaging device 10 may be used and thus the imaging device 10 may be configured as a so-called interchangeable lens type imaging device. This is similar to the imaging device 10 according to the first embodiment described above.

The example of the functional configuration of the imaging device 10 according to the embodiment has been described above with reference to FIG. 16.

2.3. Processes

Figure 17:
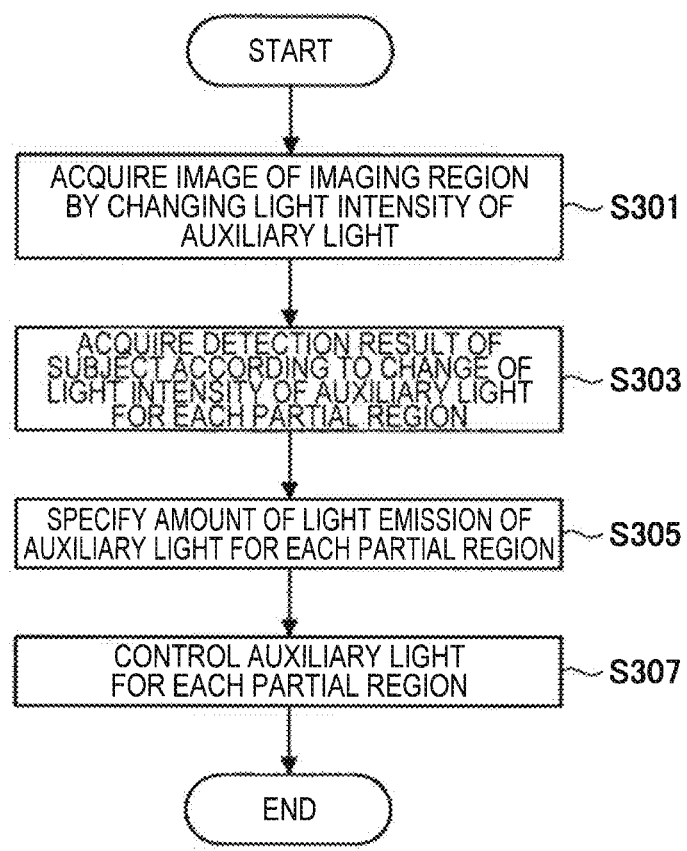
FIG. 17 is a flowchart showing an example of a flow of a series of processes of the imaging device according to the embodiment.

Next, an example of a flow of a series of processes of the imaging device 10 according to the embodiment will be described with reference to FIG. 17 with a focus particularly on an operation of the imaging device 10 controlling light intensities of auxiliary light beams emitted from the auxiliary light emitting units 13. FIG. 17 is a flowchart showing an example of a flow of a series of processes of the imaging device 10 according to the embodiment.

(Step S301)

The analysis unit 217 causes the auxiliary light control unit 213 to control operations of the auxiliary light emitting units 13 such that, at a timing that is determined in advance, light intensities are sequentially changed and auxiliary light beams are emitted from the auxiliary light emitting units 13. When an instruction from the analysis unit 217 is received, the auxiliary light control unit 213 causes the auxiliary light emitting units 13 to sequentially change light intensities of auxiliary light beams to be emitted and to emit auxiliary light for each of the changed light intensities.

In addition, the analysis unit 217 causes the imaging control unit 215 to control an operation of the imaging unit 15 such that, for each of the changed light intensities of auxiliary light, the imaging unit 15 captures an image of the imaging region r11 (in other words, images of the partial regions r21). When an instruction from the analysis unit 217 is received, the imaging control unit 215 causes the imaging unit 15 to capture an image of the imaging region r11 and outputs the captured image to the analysis unit 217. As described above, the analysis unit 217 acquires a series of images of the imaging region r11 captured for each light intensity of auxiliary light emitted from the auxiliary light emitting units 13 from the imaging control unit 215.

(Step S303)

The analysis unit 217 analyzes the acquired series of images of the imaging region r11 and thus performs a process of detecting a subject in the partial region r21 for each of the partial regions r21.

(Step S305)

Then, the analysis unit 217 specifies a light intensity of auxiliary light when the subject in the partial region r21 is detected for each of the partial regions r21 based on a result obtained by performing a process of detecting the subject in the acquired series of images of the imaging region r11. Then, the analysis unit 217 outputs information indicating a light intensity of auxiliary light specified for each of the partial regions r21 to the auxiliary light control unit 213.

(Step S307)

The auxiliary light control unit 213 acquires information indicating a light intensity of auxiliary light for each of the partial regions r21 specified by the analysis unit 217 from the analysis unit 217. The auxiliary light control unit 213 controls a light intensity of auxiliary light emitted from the auxiliary light emitting units 13 associated with the partial region r21 according to the acquired information indicating a light intensity of auxiliary light for each of the partial regions r21.

According to the configuration described above, the imaging device 10 according to the embodiment controls a light intensity of auxiliary light that is emitted toward the partial region r21 for each of the partial regions r21 in the imaging region r11. In such a configuration, the imaging device 10 according to the embodiment can reduce nonuniformity of brightness and implement a more suitable imaging environment even under a situation in which the brightness of the imaging region is nonuniform.

The example of a flow of a series of processes of the imaging device 10 according to the embodiment has been described above with reference to FIG. 17 with a focus particularly on an operation of the imaging device 10 controlling light intensities of auxiliary light beams emitted from the auxiliary light emitting units 13.

2.4. Modified Example

Next, a modified example of the imaging device 10 according to the embodiment will be described. As described above, the imaging device 10 according to the embodiment sequentially changes light intensities of auxiliary light beams emitted toward the partial regions r21, acquires an image of the imaging region r11 for each of the changed light intensities, and thus performs a process of detecting a subject for each of the partial regions r21. Then, the imaging device 10 sets a light intensity of auxiliary light that is emitted from the auxiliary light emitting units 13 associated with each of the partial regions r21 as a light intensity at which the subject in the partial region r21 is detected.

In such a configuration, it is necessary for the imaging device 10 according to the embodiment to capture a plurality of images in order to emit light intensities of auxiliary light beams emitted from the auxiliary light emitting units 13 and it is difficult to sequentially adjust light intensities of auxiliary light beams.

Figure 18:
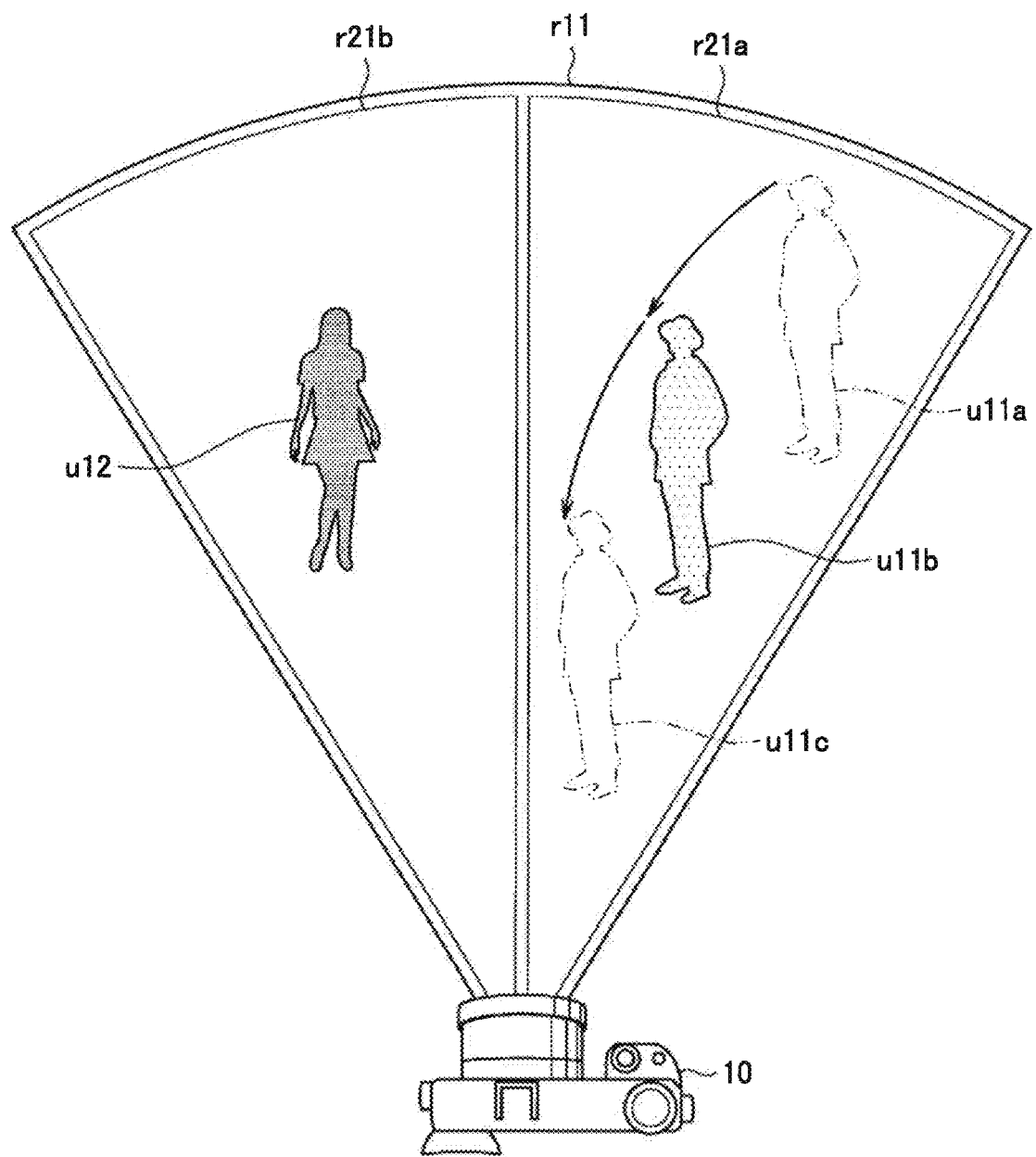
FIG. 18 is an explanatory diagram for describing an overview of an imaging device according to a modified example of the embodiment.

Therefore, as a modified example of the embodiment, an example of a mechanism through which the imaging device 10 according to the embodiment can sequentially adjust light intensities of auxiliary light beams will be described with reference to FIG. 18. FIG. 18 is an explanatory diagram for describing an overview of the imaging device 10 according to a modified example of the embodiment.

Also, in the example shown in FIG. 18, the imaging device 10 divides the imaging region r11 into a plurality of partial regions r21a and r21b, and emits auxiliary light toward the partial regions r21a and r21b using different auxiliary light emitting units 13a and 13b. In addition, a case in which the subject u11 is in the partial region r21a and the subject u12 is in the partial region r21b will be described.

The imaging device 10 according to the modified example estimates first a three-dimensional position of the subject in the imaging region r11 based on an adjustment result (in other words, a detection result of a subject in an image according to a light intensity of auxiliary light) of light intensities of auxiliary light beams emitted from the auxiliary light emitting units 13 described in the above-described embodiment.

As a specific example, the imaging device 10 estimates a position of each subject in a longitudinal direction and a lateral direction when the imaging region r11 side is viewed from the imaging device 10 according to a position of the subject in the image.

In addition, the imaging device 10 estimates a position (in other words, a distance between the auxiliary light emitting unit 13 and the subject) of the subject in a depth direction according to a light intensity of auxiliary light that is emitted toward the subject when the subject is detected based on the captured image of the imaging region r11. In this case, a relation between a position of the subject in the depth direction and a light intensity of auxiliary light at which the subject can be detected is confirmed in advance by an experiment or the like, and data indicating the relation may be stored in a region which is readable by the imaging device 10. Accordingly, the imaging device 10 checks a light intensity of auxiliary light when the subject is detected based on the captured image of the imaging region r11 and the data and thus can estimate a position of the subject in the depth direction.

As described above, the imaging device 10 according to the modified example estimates first a three-dimensional position of the subject in the imaging region r11 for each of the partial regions r21.

When the three-dimensional position of the subject in the imaging region r11 has been completely estimated, the imaging device 10 captures images of the imaging region r11 in time series for each of timings that have been determined in advance and maintains the images of a predetermined period. In addition, when the images captured in time series of a predetermined period are retained the imaging device 10 analyzes the plurality of images and thus calculates a change of a relative position of the subject in the imaging region r11.

Also, the imaging device 10 may calculate a change of a relative position of the subject in time series according to, for example, a change of a position of the subject in the image and a change of a size of the subject.

Then, based on a position of the subject estimated based on an adjustment result of a light intensity of auxiliary light and a change of a relative position of the subject calculated based on a plurality of images captured in time series, the imaging device 10 specifies a position of the moved subject for each of the partial regions r21.

Specifically, in the example shown in FIG. 18, when the imaging device 10 adjusts light intensities of auxiliary light beams emitted from the auxiliary light emitting units 13, a position indicated by a reference sign u11a is assumed as a position of the subject u11. In this case, the imaging device 10 estimates the three-dimensional position u11a of the subject u11 in the imaging region r11 based on an adjustment result of a light intensity of auxiliary light emitted from the auxiliary light emitting unit 13a associated with the partial region r21a.

Next, the subject u11 is assumed to move to a position indicated by a reference sign u11b from the position u11a. In this case, the imaging device 10 analyzes a plurality of images (that is, images of the imaging region r11) captured in time series in a period during which the subject u11 moves from the position u11a to the position u11b, and thus calculates a change of a relative position of the subject u11 that moves from the position u11a to the position u11b. Then, the imaging device 10 specifies the position u11b of the moved subject u11 based on the position u11a of the subject u11 estimated based on an adjustment result of a light intensity of auxiliary light and a change of a relative position of the subject u11 calculated based on a plurality of images captured in time series.

As described above, the imaging device 10 tracks a position of the subject in the imaging region r11 in time series. Then, the imaging device 10 sequentially controls a light intensity of auxiliary light emitted from the auxiliary light emitting unit 13 associated with the partial region r21 according to a tracking result of the subject (that is, according to a change of the position of the subject).

As a specific example, the imaging device 10 detects the subject u11 that is moving from the position u11a to the position u11b (that is, approaches the imaging device 10) as shown in the example of FIG. 18.

As described above, when auxiliary light of the same light intensity is emitted toward subjects at positions at which distances from the auxiliary light emitting unit 13 are different, a subject at a position closer to the auxiliary light emitting unit 13 is illuminated more brightly. Therefore, in the example shown in FIG. 18, the imaging device 10 controls the auxiliary light emitting unit 13a associated with the partial region r21a such that a light intensity of auxiliary light emitted toward the partial region r21a is further limited according to movement of the subject u11 from the position u11a to the position u11b.

In addition, the imaging device 10 estimates the subsequent position change of the subject based on the tracking result of the subject and may control a light intensity of auxiliary light emitted from the auxiliary light emitting unit 13 associated with the partial region r21 in which the subject will be positioned according to the estimation result.

As a specific example, based on a change of the position of the subject u11 from the position u11a to the position u11b, the imaging device 10 may estimate the subsequent movement of the subject u11 from the position u11b to a position u11c. As a specific example, based on a change of a movement speed and a movement direction of the subject u11 that moves from the position u11a to the position u11b, the imaging device 10 may estimate the subsequent position u11c to which the subject u11 moves.

In this case, the imaging device 10 may control an operation of the auxiliary light emitting unit 13a such that auxiliary light of an appropriate light intensity is emitted toward the subject u11 at the position u11c according to a timing at which the subject u11 moves to the position u11c based on the estimation result of the change of the position.

Based on such a configuration, the imaging device 10 according to the modified example tracks a position of the subject that moves in the imaging region r11 and controls a light intensity of auxiliary light that is emitted toward the partial region r21 in which the subject is positioned according to the tracking result. Therefore, the imaging device 10 according to the modified example can sequentially adjust light intensities of auxiliary light beams according to a change of the position of the subject based on images that are sequentially captured in time series even under a situation in which a position of the subject changes in time series.

Also, in the example described above, the imaging device 10 estimates a three-dimensional position of the subject in the imaging region r11 based on an adjustment result of light intensities of auxiliary light beams emitted from the auxiliary light emitting units 13. On the other hand, as long as the imaging device can estimate a three-dimensional position of the subject in the imaging region r11, a method thereof is not necessarily limited to the method based on an adjustment result of light intensities of auxiliary light beams emitted from the auxiliary light emitting units 13 described above. As a specific example, the imaging device 10 may estimate a three-dimensional position of the subject in the imaging region r11 based on a detection result of a distance measuring sensor (for example, a depth sensor).

In addition, as another example, similarly to the imaging device 10 according to the above-described first embodiment, the imaging device 10 may estimate a three-dimensional position of the subject in the imaging region r11 based on an adjustment result of a light intensity of auxiliary light according to a luminance distribution for each of the partial regions r21.

As the modified example of the imaging device 10 according to the embodiment, the example of a mechanism through which the imaging device 10 according to the embodiment can sequentially adjust light intensities of auxiliary light beams has been described above with reference to FIG. 18.

2.5. Summary

As described above, the imaging device 10 according to the embodiment divides the imaging region r11 into the plurality of partial regions r21 and associates the different auxiliary light emitting units 13 with the partial regions r21 in advance. Then, the imaging device 10 emits auxiliary light from the auxiliary light emitting unit 13 associated with the partial region r21 toward the partial regions r21 and thus controls brightness for each of the partial regions r21.

In addition, in this case, the imaging device 10 uses a technology for detecting a predetermined subject such as a facial recognition technology, detects the subject in the image of the imaging region r11 captured by the imaging unit 15 for each of the partial regions r21, and thus controls an operation of each of the auxiliary light emitting units 13 according to the detection result.

Specifically, the imaging device 10 according to the embodiment sequentially changes light intensities of auxiliary light beams emitted toward the partial regions r21, acquires an image of the imaging region r11 for each of the changed light intensities, and thus performs a process of detecting a subject for each of the partial regions r21. Then, the imaging device 10 sets a light intensity of auxiliary light that is emitted from the auxiliary light emitting units 13 associated with each of the partial regions r21 as a light intensity at which the subject in the partial region r21 is detected.

According to such control, the imaging device 10 according to the embodiment can perform control such that auxiliary light of an appropriate light intensity is emitted toward the subject in each of the partial regions r21. That is, the imaging device 10 according to the embodiment can reduce nonuniformity of brightness and implement a more suitable imaging environment even under a situation in which the brightness of the imaging region is nonuniform.

In addition, the imaging device 10 according to the embodiment controls a light intensity of auxiliary light that is emitted from the auxiliary light emitting unit 13 according to the detection result of the subject that is determined in advance. Therefore, the imaging device 10 can control a light intensity of auxiliary light that is emitted from each of the auxiliary light emitting units 13 such that the subject serving as a detection target is illuminated at appropriate brightness independently of brightness of another subject different from the target subject.

Also, it should be noted that the imaging device 10 according to the embodiment may be applied as an imaging device of the information processing device 70 shown in Modified Example 1 of the above-described first embodiment.

In addition, control of the imaging device 10 shown in Modified Examples 2 and 3 of the above-described first embodiment may be applied to the imaging device 10 according to the embodiment. That is, the imaging device 10 according to the embodiment has a configuration in which the plurality of auxiliary light emitting units 13 emit auxiliary light toward one partial region r21 and the imaging device 10 may control light intensities of auxiliary light beams emitted from the auxiliary light emitting units 13 as in Modified Examples 2 and 3 of the above-described first embodiment.

3. Hardware Configuration

Figure 19:
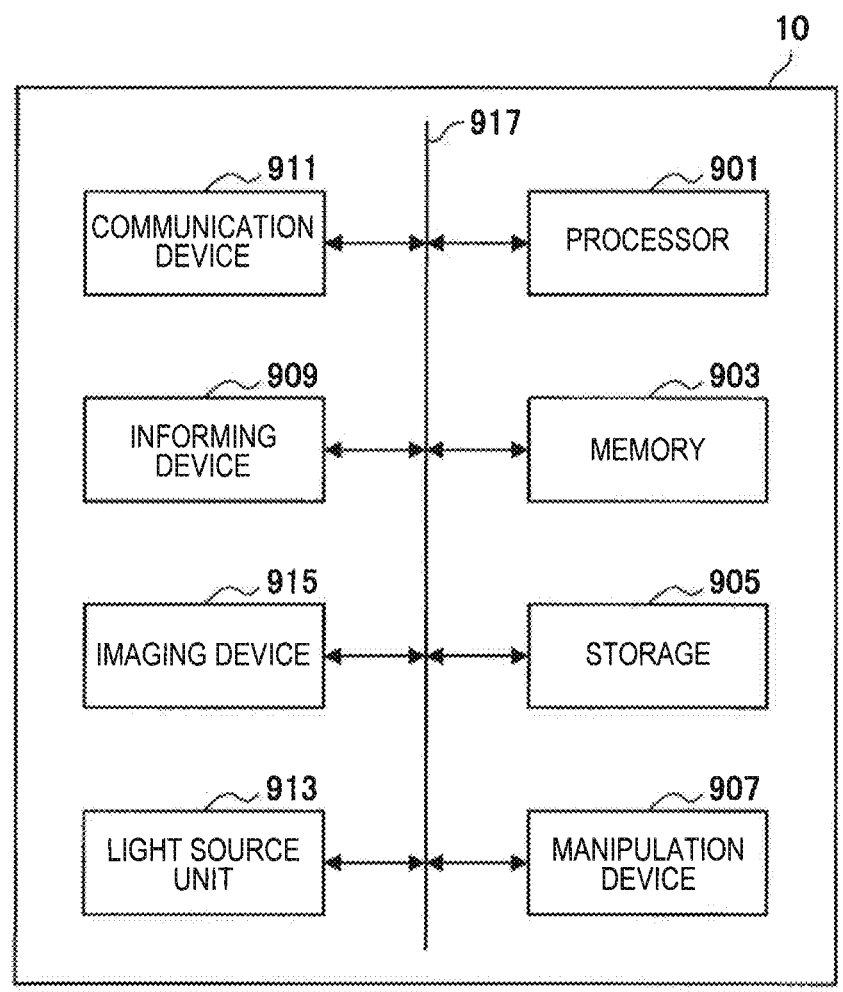
FIG. 19 is a diagram showing an example of a hardware configuration of an imaging device according to each embodiment of the present disclosure.

Next, an example of a hardware configuration of the imaging device 10 according to the embodiments of the present disclosure will be described with reference to FIG. 19. FIG. 19 is a diagram showing an example of a hardware configuration of the imaging device 10 according to the embodiments of the present disclosure.

As shown in FIG. 19, the imaging device 10 according to the embodiment includes a processor 901, a memory 903, a storage 905, a communication device 911, a light source unit 913, an imaging device 915, and a bus 917. In addition, the imaging device 10 may include a manipulation device 907 and an informing device 909.

The processor 901 may be, for example, a central processing unit (CPU), a graphics processing unit (GPU), a digital signal processor (DSP) or a system on chip (SoC), and performs various processes of the imaging device 10. For example, the processor 901 can be configured by an electronic circuit for performing various types of computing processing. Note that the configurations of the control units 1i and 21 described above may be implemented by the processor 901.

The memory 903 includes a random access memory (RAM) and a read only memory (ROM), and stores programs and data that will be executed by the processor 901. The storage 905 may include a storage medium such as a semiconductor memory or a hard disk.

The manipulation device 907 has a function of generating an input signal for the user to perform a desired manipulation. The manipulation device 907 may include an input unit for the user to input information, for example, a button or a switch, and an input control circuit configured to generate an input signal based on an input by the user and supply the signal to the processor 901.

The informing device 909 is an example of an output device, and may be a device, for example, a liquid crystal display (LCD) device and an organic EL (organic light emitting diode (OLED)) display. In this case, the informing device 909 can inform the user of predetermined information by displaying a screen.

In addition, as another example, the informing device 909 may be a device configured to inform the user of predetermined information using a light or blinking pattern such as a light emitting diode (LED). Also, the informing device 909 may be a device configured to inform the user of predetermined information by outputting a predetermined acoustic signal such as a speaker.

The communication device 911 is a communication component of the imaging device 10 according to an embodiment of the present disclosure, and communicates with an external device via a network. The communication device 911 has a wired or wireless communication interface. When the communication device 911 is configured as a wireless communication interface, the communication device 911 may include a communication antenna, a radio frequency (RF) circuit, and a baseband processor.

The communication device 911 has a function of performing various types of signal processing on a signal received from the external device, and can supply a digital signal generated from a received analog signal to the processor 901.

The light source unit 913 is a unit configured to emit auxiliary light and has a configuration capable of emitting light (for example, infrared light) having a wavelength that is determined in advance. The light source unit 913 includes, for example, a light emitting diode (LED). It should be noted that the light source unit 913 is not necessarily limited to an LED as long as it can emit light having a wavelength that is determined in advance. Also, the above-described auxiliary light emitting unit 13 may be implemented by the light source unit 913.

The imaging device 915 includes an imaging element such as a complementary metal-oxide semiconductor (CMOS) image sensor and a charge coupled device (CCD)

image sensor that captures a subject and obtains digital data of the captured image. That is, the imaging device 915 has a function of capturing a still image or a moving image through a lens under control of the processor 901. The imaging device 915 may store the captured image in the memory 903 or the storage 905. Also, the above-described imaging unit 15 may be implemented by the imaging device 915.

The bus 917 connects the processor 901, the memory 903, the storage 905, the manipulation device 907, the informing device 909, the communication device 911, the light source unit 913, and the imaging device 915 to one another. The bus 917 may include a plurality of types of buses.

In addition, a program allowing hardware such as a processor, a memory, and a storage built into a computer to execute the same functions as the components of the above-described imaging device 10 can be created. In addition, a computer readable storage medium in which the program is recorded may be provided.

4. Summary

As described above, the imaging device 10 according to the embodiments of the present disclosure divides the imaging region r11 into the plurality of partial regions r21 and associates different auxiliary light emitting units 13 with the partial regions r21 in advance. Then, the imaging device 10 emits auxiliary light from the auxiliary light emitting unit 13 associated with the partial region r21 toward the partial regions r21 and thus controls brightness for each of the partial regions r21. In addition, in this case, the imaging device 10 controls a light intensity of auxiliary light emitted from the auxiliary light emitting unit 13 associated with the partial region r21 for each of the partial regions r21 according to an analysis result of the captured image of the imaging region r11. In such a configuration, the imaging device 10 according to the embodiments of the present disclosure can reduce nonuniformity of brightness and implement a more suitable imaging environment even under a situation in which the brightness of the imaging region is nonuniform.

Note that, while the example in which the imaging device 10 according to the embodiments of the present disclosure is configured as an imaging device such as a so-called digital camera has been described above, a configuration of the imaging device 10 is not necessarily limited thereto. As a specific example, the imaging device 10 may be configured as a so-called monitoring camera. In addition, as another example, the imaging device 10 may be a component for capturing an image of a region in order for various devices such as a television device to detect a user in a predetermined region.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)
A control device including:
an acquisition unit configured to acquire an image that is captured by an imaging unit; and
a control unit configured to control light intensities of auxiliary light beams emitted from auxiliary light emitting units that are associated in advance with a plurality of partial regions in an imaging region determined based on an angle of view of the imaging unit among the plurality of auxiliary light emitting units based on an analysis result of the acquired image.

(2)
The control device according to (1),
wherein the control unit controls a light intensity of the auxiliary light emitted from the auxiliary light emitting unit associated in advance with the partial region according to a luminance distribution of a region in the acquired image that corresponds to the partial region.

(3)
The control device according to (1),
wherein the control unit controls a light intensity of the auxiliary light emitted from the auxiliary light emitting unit associated in advance with the partial region according to a detection result of a subject that is positioned in the partial region based on the analysis result of the image.

(4)
The control device according to (3),
wherein the control unit sequentially changes a light intensity of the auxiliary light emitted from the auxiliary light emitting unit associated with the partial region and determines a light intensity of the auxiliary light emitted from the auxiliary light emitting unit according to a detection result of the subject that is positioned in the partial region based on the analysis result of the acquired image according to the change of the light intensity.

(5)
The control device according to (3) or (4), wherein
the subject is a human body, and
the control unit controls a light intensity of the auxiliary light emitted from the auxiliary light emitting unit associated in advance with the partial region according to a detection result of a portion of at least a part of the human body that is positioned in the partial region.

(6)
The control device according to any one of (1) to (5),
wherein the control unit controls a light intensity of the auxiliary light emitted from the auxiliary light emitting unit based on a light emission time of the auxiliary light emitting unit.

(7)
The control device according to any one of (1) to (6),
wherein the control unit controls a light intensity of the auxiliary light emitted from the auxiliary light emitting unit based on an amount of light emission of the auxiliary light emitting unit.

(8)
The control device according to any one of (1) to (7),
wherein the control unit controls a light intensity of the auxiliary light emitted from each of the plurality of auxiliary light emitting units associated in advance with the partial region.

(9)
The control device according to (8),
wherein the control unit estimates a distance between a subject and each of the plurality of auxiliary light emitting units according to a relative positional relation between the subject positioned in the partial region and each of the plurality of auxiliary light emitting units associated with the partial region and controls a light intensity of the auxiliary light emitted from each of the plurality of auxiliary light emitting units according to an estimation result of the distance.

(10)

The control device according to (8),
wherein the control unit extracts, from the image, shadows of a subject that are formed by emitting the auxiliary light from the plurality of auxiliary light emitting units associated with the partial region toward the subject positioned in the partial region, and controls light intensities of the auxiliary light emitted from the plurality of auxiliary light emitting units according to depths of the extracted shadows of the subject.

(11)

The control device according to (10),
wherein the control unit controls a light intensity of the auxiliary light emitted from each of plurality of auxiliary light emitting units in a manner that a difference between the depths of the extracted shadows of the subject becomes a threshold value or less.

(12)

The control device according to any of (1) to (11),
wherein the control unit estimates a change of a position of a subject in the partial region in time series based on an analysis result of a plurality of the images acquired in the time series and controls a light intensity of the auxiliary light emitted from the auxiliary light emitting unit associated in advance with the partial region according to the estimation result.

(13)

The control device according to (12),
wherein the control unit estimates a change of a position of the subject in the partial region according to a position of the subject in the partial region that is estimated in advance and a change of the subject in the image among a plurality of the images acquired in time series during a predetermined period.

(14)

The control device according to any one of (1) to (13),
wherein the control unit suppresses emission of the auxiliary light from the auxiliary light emitting unit when a distance between a subject in the partial region and the auxiliary light emitting unit associated in advance with the partial region is less than a threshold value.

(15)

The control device according to any one of (1) to (14), including
at least any of the plurality of auxiliary light emitting units.

(16)

The control device according to any one of (1) to (15), including the imaging unit.

(17)

A control method including:
acquiring an image captured by an imaging unit; and
controlling, by processor, light intensities of auxiliary light beams emitted from auxiliary light emitting units that are associated in advance with a plurality of partial regions in an imaging region determined based on an angle of view of the imaging unit among the plurality of auxiliary light emitting units based on an analysis result of the acquired image.

(18)

A program causing a computer to execute:
acquiring an image captured by an imaging unit; and
controlling light intensities of auxiliary light beams emitted from auxiliary light emitting units that are associated in advance with a plurality of partial regions in an imaging region determined based on an angle of view of the imaging unit among the plurality of auxiliary light emitting units based on an analysis result of the acquired image.

REFERENCE SIGNS LIST

10 imaging device
11 control unit
111 synchronization control unit
113 auxiliary light control unit
115 imaging control unit
117 analysis unit
13 auxiliary light emitting unit
21 control unit
211 synchronization control unit
213 auxiliary light control unit
215 imaging control unit
217 analysis unit
70 information processing device

The invention claimed is:

1. A control device comprising:
an acquisition unit configured to acquire an image that is captured by an imaging device; and
a control unit configured to control light intensities of auxiliary light emitted from a plurality of auxiliary light emitting units that are each associated in advance with a respective partial region of a plurality of partial regions in an imaging region determined based on an angle of view of the imaging device among the plurality of auxiliary light emitting units based on an analysis result of the acquired image in order to reduce nonuniformity of brightness in the imaging region,
wherein the control unit controls a light intensity of the auxiliary light emitted from each respective auxiliary light emitting unit of the plurality of auxiliary light emitting units that is associated in advance with the respective partial region of the plurality of partial regions such that a difference between depths of a plurality of shadows formed on a projection plane within the acquired image by the auxiliary light emitted from the plurality of auxiliary light emitting units is less than or equal to a predetermined threshold, and
wherein the acquisition unit and the control unit are each implemented via at least one processor.

2. The control device according to claim 1,
wherein the control unit controls the light intensity of the auxiliary light emitted from each respective auxiliary light emitting unit of the plurality of auxiliary light emitting units that is associated in advance with a respective partial region of the plurality of partial regions according to a luminance distribution of a region in the acquired image that corresponds to the respective partial region.

3. The control device according to claim 1,
wherein the control unit controls the light intensity of the auxiliary light emitted from each respective auxiliary light emitting unit of the plurality of auxiliary light emitting units that is associated in advance with the partial region according to a detection result of a subject that is positioned in respective partial region of the plurality of partial regions based on the analysis result of the image.

4. The control device according to claim 3, wherein the control unit sequentially changes the light intensity of the auxiliary light emitted from each respective auxiliary light emitting unit associated with the respective partial region and determines the light intensity of the auxiliary light emitted from each respective auxiliary light emitting unit according to a detection result of the subject that is positioned in the respective partial region based on the analysis result of the acquired image according to the change of the light intensity.

5. The control device according to claim 3, wherein the subject comprises a human body, and the control unit controls the light intensity of the auxiliary light emitted from each respective auxiliary light emitting unit associated in advance with the respective partial region according to a detection result of a portion of at least a part of the human body that is positioned in the respective partial region.

6. The control device according to claim 1, wherein the control unit controls the light intensity of the auxiliary light emitted from each respective auxiliary light emitting unit of the plurality of auxiliary light emitting units based on a light emission time of the respective auxiliary light emitting unit.

7. The control device according to claim 1, wherein the control unit controls the light intensity of the auxiliary light emitted from each respective auxiliary light emitting unit of the plurality of auxiliary light emitting units based on an amount of light emission of the respective auxiliary light emitting unit.

8. The control device according to claim 1, wherein the control unit estimates a distance between a subject and each respective auxiliary light emitting unit of the plurality of auxiliary light emitting units according to a relative positional relation between the subject positioned in the respective partial region and each respective auxiliary light emitting unit of the plurality of auxiliary light emitting units that is associated with the respective partial region and controls the light intensity of the auxiliary light emitted from each respective auxiliary light emitting unit of the plurality of auxiliary light emitting units according to an estimation result of the distance.

9. The control device according to claim 1, wherein the control unit extracts, from the acquired image, the shadows that are formed by emitting the auxiliary light from the plurality of respective auxiliary light emitting units that are associated with the respective partial region toward the subject positioned in the respective partial region and determines the depths of the extracted shadows.

10. The control device according to claim 1, wherein the control unit estimates a change of a position of a subject in the respective partial region of the plurality of partial regions in time series based on an analysis result of a plurality of images acquired in the time series and controls the light intensity of the auxiliary light emitted from each respective auxiliary light emitting unit of the plurality of auxiliary light emitting units that is associated in advance with the respective partial region according to the estimation result.

11. The control device according to claim 10, wherein the control unit estimates the change of the position of the subject in the respective partial region according to a position of the subject in the respective partial region that is estimated in advance and a change of the subject in the plurality of the images acquired in the time series during a predetermined period.

12. The control device according to claim 1, wherein the control unit suppresses emission of the auxiliary light from a respective auxiliary light emitting unit of the plurality of auxiliary light emitting units when a distance between a subject in the respective partial region of the plurality of partial regions and the respective auxiliary light emitting unit associated in advance with the respective partial region is less than a threshold value.

13. The control device according to claim 1, further comprising:
at least any of the plurality of auxiliary light emitting units.

14. The control device according to claim 1, further comprising:
the imaging device.

15. A control method, implemented via at least one processor, the method comprising:
acquiring an image captured by an imaging device; and
controlling, by the at least one processor, light intensities of auxiliary light emitted from a plurality of auxiliary light emitting units that are each associated in advance with a respective partial region of a plurality of partial regions in an imaging region determined based on an angle of view of the imaging device among the plurality of auxiliary light emitting units based on an analysis result of the acquired image in order to reduce nonuniformity of brightness in the imaging region,
wherein a light intensity of the auxiliary light emitted from each respective auxiliary light emitting unit of the plurality of auxiliary light emitting units that is associated in advance with the respective partial region of the plurality of partial regions is controlled such that a difference between depths of a plurality of shadows formed on a projection plane within the acquired image by the auxiliary light emitted from the plurality of auxiliary light emitting units is less than or equal to a predetermined threshold.

16. A non-transitory computer-readable medium having embodied thereon a program, which when executed by a computer causes the computer to execute a method, the method comprising:
acquiring an image captured by an imaging device; and
controlling light intensities of auxiliary light emitted from a plurality of auxiliary light emitting units that are each associated in advance with a respective partial region of a plurality of partial regions in an imaging region determined based on an angle of view of the imaging device among the plurality of auxiliary light emitting units based on an analysis result of the acquired image in order to reduce nonuniformity of brightness in the imaging region,
wherein a light intensity of the auxiliary light emitted from each respective auxiliary light emitting unit of the plurality of auxiliary light emitting units that is associated in advance with the respective partial region of the plurality of partial regions is controlled such that a difference between depths of a plurality of shadows formed on a projection plane within the acquired image by the auxiliary light emitted from the plurality of auxiliary light emitting units is less than or equal to a predetermined threshold.

17. The control device according to claim 1, wherein, when a shadow formed by a respective auxiliary light emitting unit is darker than shadows formed by other auxiliary light emitting units, the control unit decreases the light intensity of the auxiliary light emitted from the respective auxiliary light emitting unit.

18. The control device according to claim 1, wherein, when a shadow formed by a respective auxiliary light emitting unit is lighter than shadows formed by other auxiliary light emitting units, the control unit increases the light intensity of the auxiliary light emitted from the respective auxiliary light emitting unit.

19. The control device according to claim 1, wherein, when a particular shadow of the plurality of shadows formed on the projection plane within the acquired image is darker than other shadows of the plurality of shadows by more than the predetermined threshold, the light intensity of the auxiliary light emitted from a corresponding auxiliary light emitting unit is controlled to be lower, and wherein, when the particular shadow of the plurality of shadows formed on the projection plane within the acquired image is brighter than the other shadows of the plurality of shadows by more than the predetermined threshold, the light intensity of the auxiliary light emitted from the corresponding auxiliary light emitting unit is controlled to be higher.

* * * * *